US008326130B2

(12) United States Patent
Kitajima

(10) Patent No.: US 8,326,130 B2
(45) Date of Patent: Dec. 4, 2012

(54) VIDEO IMAGE DATA REPRODUCING APPARATUS

(75) Inventor: Kotaro Kitajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1176 days.

(21) Appl. No.: 11/868,721

(22) Filed: Oct. 8, 2007

(65) Prior Publication Data

US 2008/0088741 A1 Apr. 17, 2008

(30) Foreign Application Priority Data

Oct. 17, 2006 (JP) ................................ 2006-283144
Aug. 20, 2007 (JP) ................................ 2007-213826

(51) Int. Cl.
*H04N 5/92* (2006.01)
*H04N 9/80* (2006.01)
*H04N 5/84* (2006.01)
*H04N 5/89* (2006.01)

(52) U.S. Cl. ........ 386/326; 386/239; 386/240; 386/245; 386/248; 386/332; 386/338; 386/339; 386/340

(58) Field of Classification Search .................. 386/239, 386/240, 245, 248, 326, 332, 338, 339, 340
See application file for complete search history.

(56) References Cited

U.S. PATENT DOCUMENTS 5,778,142 A 7/1998 Taira et al.
7,769,277 B2 * 8/2010 Kim et al. .................... 386/241
2002/0150384 A1 * 10/2002 Yoo et al. ...................... 386/69
2005/0135787 A1 * 6/2005 Yoo et al. ...................... 386/95
2005/0207737 A1 * 9/2005 Seo et al. ...................... 386/95
2006/0112808 A1 * 6/2006 Kiiskinen et al. .............. 84/484

FOREIGN PATENT DOCUMENTS

JP 08-263969 A 10/1996
JP 10-271452 A 10/1998
WO 2006-093218 A1 9/2006

OTHER PUBLICATIONS

Aug. 23, 2011 Japanese Office Action, that issued in Japanese Patent Application No. 2007-213826.

* cited by examiner

*Primary Examiner* — Daquan Zhao
(74) *Attorney, Agent, or Firm* — Cowan, Liebowitz & Latman, P.C.

(57) ABSTRACT

A video image reproducing apparatus reads out sub-content information related to sub-content to be reproduced, from a recording medium, obtains attribute information indicative of the features of the sub-content, on the basis of the sub-content information, and controls each reproduction procedure of the main content and the sub-content on the basis of the attribute information, so that the main content and the sub-content are reproduced in coordination with the features of the sub-content.

9 Claims, 17 Drawing Sheets

100
101
102
DISC I/F
103
DRIVE CONTROLLER
104
ERROR CORRECTION UNIT
105
FILE MANAGEMENT UNIT
106
MAIN CONTENTS DECODER
107
SUB CONTENTS DECODER
108
SYNTESIZATION UNIT
109
OUTPUT UNIT
110
SYSTEM CONTROLLER
111
PLAY LIST GENERATION UNIT
112
OPERATION UNIT

```
<smil>
    <body>
        <par>
        <seq>
        <video src="scene1.mov">
        <video src="scene2.mov">
        <video src="scene3.mov">
        <video src="scene4.mov">
        <seq>
        <unestablished>
        </par>
    </body>
</smil>
```

TIME
VIDEO IMAGE
scene1.mov
scene2.mov
scene3.mov
scene4.mov
CAPTION
caption1.txt
MAIN REPRODUCTION REQUEST TIME
VIDEO IMAGE
scene1.mov
scene2.mov
scene3.mov
scene4.mov
701
SUB CONTENTS
UNESTABLISHED 1
UNESTABLISHED 2
UNESTABLISHED 3
UNESTABLISHED 4
702
MAIN REPRODUCTION REQUEST
SUB REPRODUCTION REQUEST
SUB REPRODUCTION REQUEST
SUB REPRODUCTION REQUEST TIME
VIDEO IMAGE
scene1.mov
scene2.mov
scene3.mov
scene4.mov
CONTENTS EXPLANATION
Text1.txt
Text2.txt
Text3.txt
Text4.txt
MAIN REPRODUCTION REQUEST
SUB REPRODUCTION REQUEST
SUB REPRODUCTION REQUEST
SUB REPRODUCTION REQUEST 800
101
DISC I/F
102
ERROR CORRECTION UNIT
104
FILE MANAGEMENT UNIT
805
MAIN CONTENTS DECODER
806
FIRST OUTPUT UNIT
808
SUB CONTENTS DECODER
807
SECOND OUTPUT UNIT
809
PLAY LIST GENERATION UNIT
811
DRIVE CONTROLLER
103
SYSTEM CONTROLLER
810
OPERATION UNIT
112

TIME
1101
1102
UNESTABLISHED
RECORDED VIDEO IMAGE
MUSIC
MAIN REPRODUCTION REQUEST

TIME
RECORDED VIDEO IMAGE
rscene1. mov
rscene2. mov
rscene3. mov
rscene4. mov
rscene5. mov
rscene6. mov
rscene7. mov
rscene8. mov
rscene9. mov
rscene10. mov
MUSIC
music1.mp3
MAIN REPRODUCTION REQUEST

VIDEO IMAGE DATA REPRODUCING APPARATUS

BACKGROUND OF THE INVENTION

1. Field of the Invention

The present invention relates to a video image data reproducing apparatus, and particularly to a reproducing apparatus for reproducing main contents and sub-contents.

2. Description of the Related Art

A recording medium such as a DVD (Digital Versatile Disc) records main contents and sub-contents. The main contents include video images (e.g., movie pictures and self-taken record pictures). The sub-contents include audio (e.g., multi-language dubbed audio) and captions (e.g., multi-language captions). The audio and caption data is reproduced in a selected language which is selected by user selection through menu operation (see, e.g., Japanese Patent Application Laid-Open No. H08-263969 and its corresponding U.S. Pat. No. 5,778,142).

The recording medium also records caption management information and caption stream data. The reproducing apparatus reads out caption stream data which corresponds to an ID number selected by a viewer, from the recording medium, and decodes the read-out caption stream to display the caption stream data at a position and time determined based on the management information, with the caption stream data being overlapped with main contents (pictures).

Further, the recording medium also records audio management information and audio stream data. The reproducing apparatus reads out the audio stream data which corresponds to an ID number selected by a viewer, from the recording medium, and decodes the read-out audio stream data to display the audio stream data in coordination with main contents (pictures) at a time which is determined based on the management information.

On the other hand, an event operation may be performed so that a menu is displayed halfway during reproduction to wait for a user's menu selection operation and to accept the menu selection operation before resuming the reproduction of video images depending on the selected item. For example, such operation provides reproduction of a plurality of video image data, branch operation by user input and the like (see, Japanese Patent Application Laid-Open No. H10-271452).

Actually, the technical characteristics of the above patent document are that the sub-contents are reproduced in synchronization with the main contents. For example, traditional audio and captions (sub-contents) are synchronously reproduced with the movie (main contents).

However, there are some situations where the sub-contents should not be reproduced in synchronization with the main-contents. For example, as shown in FIG. 20, it is assumed that a request is made for reproduction of a contents explanation (sub-contents) 1302 which has detailed explanation of a movie (main-contents) 1301. The contents explanation here has a feature that provides explanation for the location of the movie, and a larger amount of information as compared to the captions. In this respect, if a contents explanation (sub-contents) is synchronously reproduced with the movie (main contents), it could be switched to the next contents explanation before the viewer reads through the contents explanation (sub-contents). In the techniques described in the above patent document, the main contents will proceed independently of features of sub-contents. That is, it is not possible to reproduce the main contents and the sub-contents in coordination with the features of the sub-contents.

SUMMARY OF THE INVENTION

It is an aspect of the present invention to provide a video image reproducing apparatus which enables coordinate reproduction of main content and sub-content with features of the sub-content.

According to an aspect of the present invention, a video image reproducing apparatus of the present invention for reproducing main content including video image data and sub-content associated with the main content, comprises: a reading unit configured to read out sub-content information related to the sub-content to be reproduced with the main content, from a recording medium; an attribution information obtaining unit for obtaining attribution information indicative of features of the sub-content, on the basis of the sub-content information; a play list generation unit configured to generate a play list for setting each reproduction procedure of the main content and the sub-content, on the basis of the attribute information; and a reproduction control unit configured to control each reproduction of the main content and the sub-content in accordance with the play list.

According to another aspect of the present invention, a video image reproducing method of the present invention for reproducing main content including video image data and sub-content associated with the main content, comprises the steps of: reading out sub-content information related to the sub-content to be reproduced with the main content, from a recording medium; obtaining attribute information indicative of features of the sub-content, on the basis of the sub-content information; generating a play list for setting each reproduction procedure of the main content and the sub-content, on the basis of the attribute information; and reproducing the main content and the sub-content in accordance with the play list.

According to another aspect of the present invention, a storage medium of the present invention computer-readably stores a program comprising a program code for causing a computer to execute a video image reproducing method for reproducing main content including video image data and sub-content associated with the main content, the method comprising the steps of: reading out sub-content information related to the sub-content to be reproduced with the main content, from a recording medium; obtaining attribute information indicative of features of the sub-content, on the basis of the sub-content information; generating a play list for setting each reproduction procedure of the main content and the sub-content, on the basis of the attribute information; and reproducing the main content and the sub-content in accordance with according to the play list.

According to another aspect of the present invention, a video image reproducing apparatus of the present invention for reproducing main content including video image data and sub-content associated with the main content, comprises: a reading unit configured to read out sub-content information related to the sub-content to be reproduced with the main content, from a recording medium; an attribute information obtaining unit configured to obtain attribute information indicative of features of the sub-content, on the basis of the sub-content information; an operation unit configured to update the reproduction of the sub-content; a determination unit configured to determine, based on the attribute information, whether to update the reproduction of the sub-content in synchronization with the reproduction of the main contents or in accordance with the operation of the operation unit; and a reproduction control unit configured to control each reproduction of the main content and the sub-content in accordance with the determination of the determination unit.

Further features and aspects of the present invention will become apparent from the following detailed description of exemplary embodiments with reference to the attached drawings.

DESCRIPTION OF THE EMBODIMENTS

Numerous exemplary embodiments, features and aspects of the present invention will be described with reference to the drawings.

First Exemplary Embodiment

Figure 1:
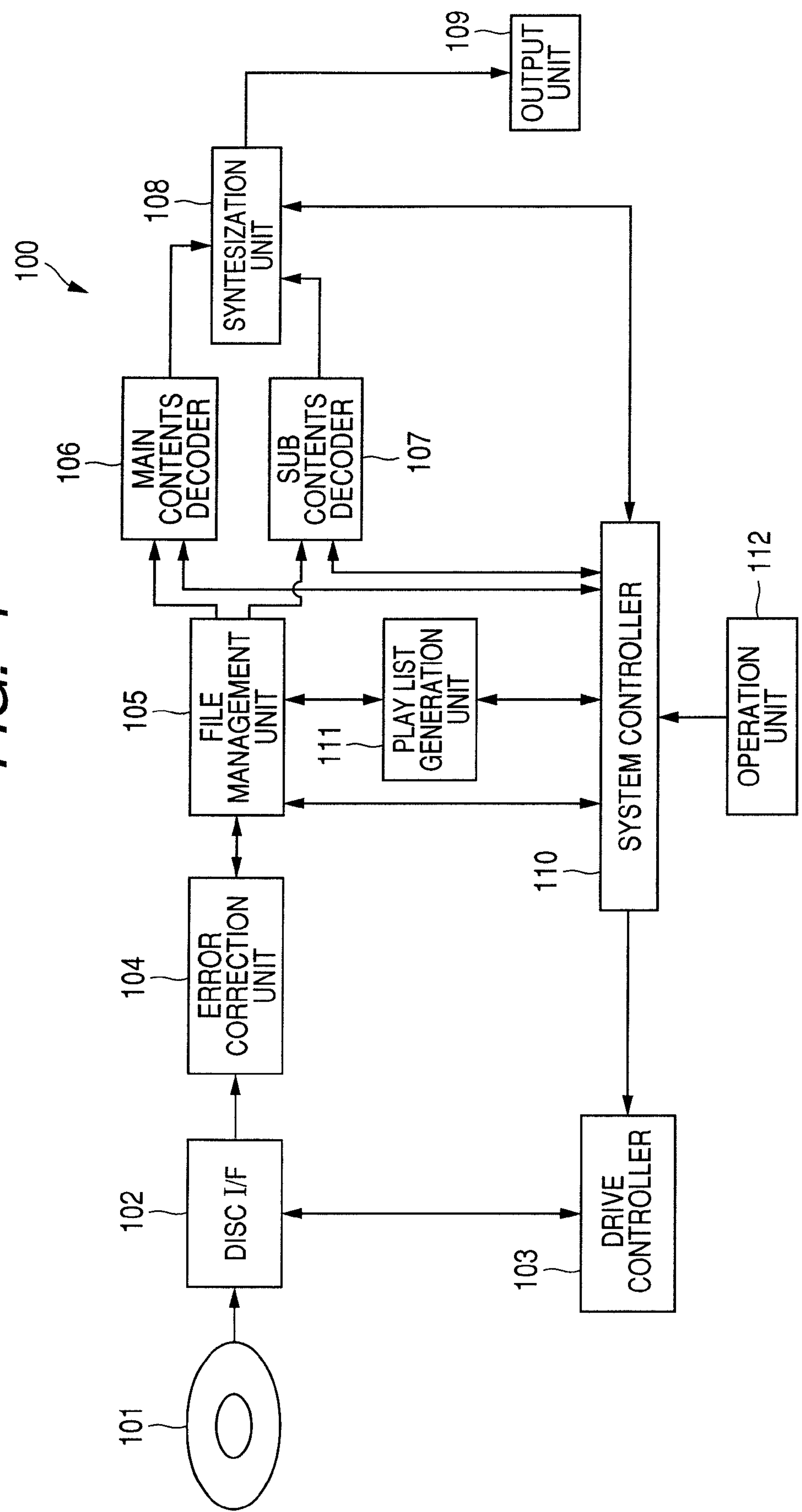
FIG. 1 is a block diagram showing an exemplary configuration of a video image reproducing apparatus according to an aspect of a first exemplary embodiment of the present invention.

An exemplary configuration of a video image data reproducing apparatus according to an aspect of a first exemplary embodiment of the present invention is described with reference to FIG. 1. FIG. 1 is an exemplary configuration diagram of the video image reproducing apparatus according to the first exemplary embodiment of the present invention.

A video image reproducing apparatus 100 is an apparatus which can reproduce video image data recorded on a recording medium 101 such as an optical disc.

The recording medium 101 records thereon medium management information, template information, main contents information and sub-contents information. The medium management information is to manage the information recorded on the recording medium 101 as described below. The template information, which is to be a play list template as described below, includes multiple types of templates in advance. The main contents information is the information that is related to the main contents (including the main contents themselves). The main contents are essential contents which include video image data. The main contents are, e.g., movies. The sub-contents information is the information that is related to the sub-contents (including the sub-contents themselves). The sub-contents are the contents associated with the main contents, including audio, captions, contents explanations, etc. The recording medium 101 records thereon the main contents information and the sub-contents information in a compressed manner according to the standard of the recording medium, and also records thereon the template information. The recording medium 101, which is, e.g., an optical disc such as a DVD, includes a sufficient amount of storage capacity and density to record video images.

The video image reproducing apparatus 100 includes a disc I/F (reading unit) 102, a drive controller 103, an error correction unit 104 and a file management unit (attribute information obtaining unit) 105. The video image reproducing apparatus 100 also includes a main contents decoder 106, a sub-contents decoder 107, a synthesization unit 108, an output unit 109, a system controller 110, a play list generation unit 111 and an operation unit 112.

The disc I/F 102 includes an optical pickup and a motor. In this respect, the disc I/F 102 reads the main contents information and the sub-contents information that are recorded on the recording medium 101.

The drive controller 103 is provided near the disc I/F 102. In this respect, the drive controller 103 drives the disc I/F 102 to read out the main contents information and the sub-contents information from the recording medium 101 into the disc I/F 102. That is, the drive controller 103 controls reproduction operation.

The error correction unit 104, which is connected to the disc I/F 102, demodulates the information read out by the disc I/F 102 (the template information, main contents information and sub-contents information) and corrects any data error in the demodulated data.

The file management unit 105, which is connected to the error correction unit 104, receives data that is demodulated/corrected by the error correction unit 104.

The main contents decoder 106, which is connected to the file management unit 105, extracts the main contents information from the data received by the file management unit 105 to decode the extracted main contents information.

The sub-contents decoder 107, which is connected to the file management unit 105, extracts the sub-contents information from the data received by the file management unit 105 to decode the extracted sub-contents information. In addition, the sub-contents decoder 107 is not always in operation and may operate only when the sub-contents needs to be decoded.

The synthesization unit 108, which is connected to the main contents decoder 106 and the sub-contents decoder 107, respectively, receives the main contents information decoded by the main contents decoder 106 and the sub-contents information decoded by the sub-contents decoder 107. The synthesization unit 108 synthesizes the main contents information and the sub-contents information as displayable data, respectively.

The output unit 109, which is connected to the synthesization unit 108, displays the data synthesized by the synthesization unit 108 as a display image on a display screen (not shown). For example, the output unit 109 serves as an external monitor.

The play list generation unit 111, which is connected to the file management unit 105, generates a play list on the basis of the data received by the file management unit 105. The play list is to control each reproduction procedure of the main contents and the sub-contents.

Input to the operation unit 112 is the request information that indicates an operational request. The operational request includes a main reproduction request and a sub-reproduction request. The main reproduction request is related to the reproduction of main contents (e.g., video images). The sub-reproduction request is related to the reproduction of sub-contents (e.g., audio, captions and contents explanations). The operation unit 112 includes a remote controller and a remote controller signal receiver. Alternatively, the operation unit 112 includes an operation key that is provided at the main body.

The system controller 110 is connected to the operation unit 112, the drive controller 103, the file management unit 105, the play list generation unit 111, the main contents decoder 106, the sub-contents decoder 107 and the synthesization unit 108. The system controller 110 receives request information from the operation unit 112 and generates a control signal, based on the request information or according to a predetermined program. The system controller 110 controls each of the drive controller 103, the file management unit 105, the play list generation unit 111, the main contents decoder 106, the sub-contents decoder 107 and the synthesization unit 108 by providing control signals thereto, respectively.

The operation of video image reproducing apparatus according to the first exemplary embodiment is described below.

For example, the operation unit 112 accepts one of a main reproduction request and a sub-reproduction request. The system controller 110 receives information related to one of the main reproduction request and the sub-reproduction request from the operation unit 112, and generates a read control signal on the basis of the information. The system controller 110 provides the read control signal to the drive controller 103.

The drive controller 103 drives, e.g., an optical pickup or a motor of the disc I/F 102 on the basis of the read control signal to cause the disc I/F 102 to read out the main contents information and the sub-contents information that are recorded on the recording medium 101.

The disc I/F 102 provides the information that is read out from the recording medium 101 (the template information, main contents information and sub-contents information) to the error correction unit 104. The error correction unit 104 demodulates the read-out information while correcting any data error in the demodulated data. The error correction unit 104 provides the demodulated/corrected data (a digital data train) to the file management unit 105.

The file management unit 105 obtains main contents identification information, sub-contents identification information, attribute information and template information from the demodulated/corrected data, respectively. That is, the file management unit 105 obtains the main contents identification information on the basis of the main contents information. The main contents identification information is the information to identify the main contents, and represents, e.g., a file name of a movie data file as described stated below. The file management unit 105 also obtains the sub-contents identification information and the attribute information based on the sub-contents information. The sub-contents identification information is the information to identify the sub-contents, and represents, e.g., a file name of a caption file or a contents explanation file as stated below. The attribute information is the information that is related to the features of the sub-contents. The template information is the information that is later to be a play list template, and includes multiple play list template files (see FIG. 9 and FIG. 11).

Based on the attribute information, the file management unit 105 selects an appropriate play list template file for the features of the sub-contents from the template information. The file management unit 105 outputs the selected play list template file as well as the main contents identification information, the sub-contents identification information and the attribute information to the play list generation unit 111.

The play list generation unit 111 generates a play list based on the selected play list template file as well as on the main contents identification information, the sub-contents identification information and the attribute information. The play list is to control each reproduction procedure of the main contents and the sub-contents. That is, the play list generation unit 111 determines each reproduction procedure of the main contents and the sub-contents in consideration of the features of the sub-contents, and accordingly arranges a play list.

The system controller 110 receives information related to a play list from the play list generation unit 111. Based on the play list, the system controller 110 controls the file management unit 105, the main contents decoder 106, the sub-contents decoder 107 and the synthesization unit 108.

This causes the file management unit 105 to provide the demodulated/corrected data to the main contents decoder 106 and the sub-contents decoder 107. The main contents decoder 106 extracts and decodes the main contents information. The sub-contents decoder 107 extracts and decodes the sub-contents information. The synthesization unit 108 receives the decoded main contents information from the main contents decoder 106 and the decoded sub-contents information from the sub-contents decoder 107. The synthesization unit 108 synthesizes the main contents information and the sub-contents information as displayable data.

Figure 3:
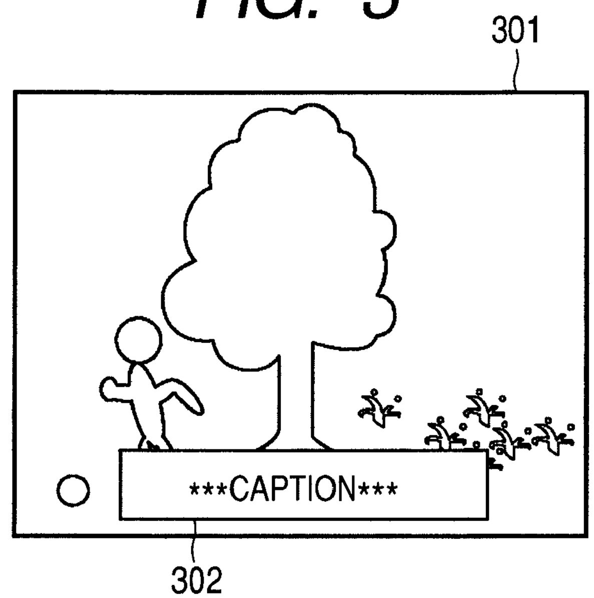
FIG. 3 is a diagram showing an exemplary screen displayed by an output unit.
Figure 4:
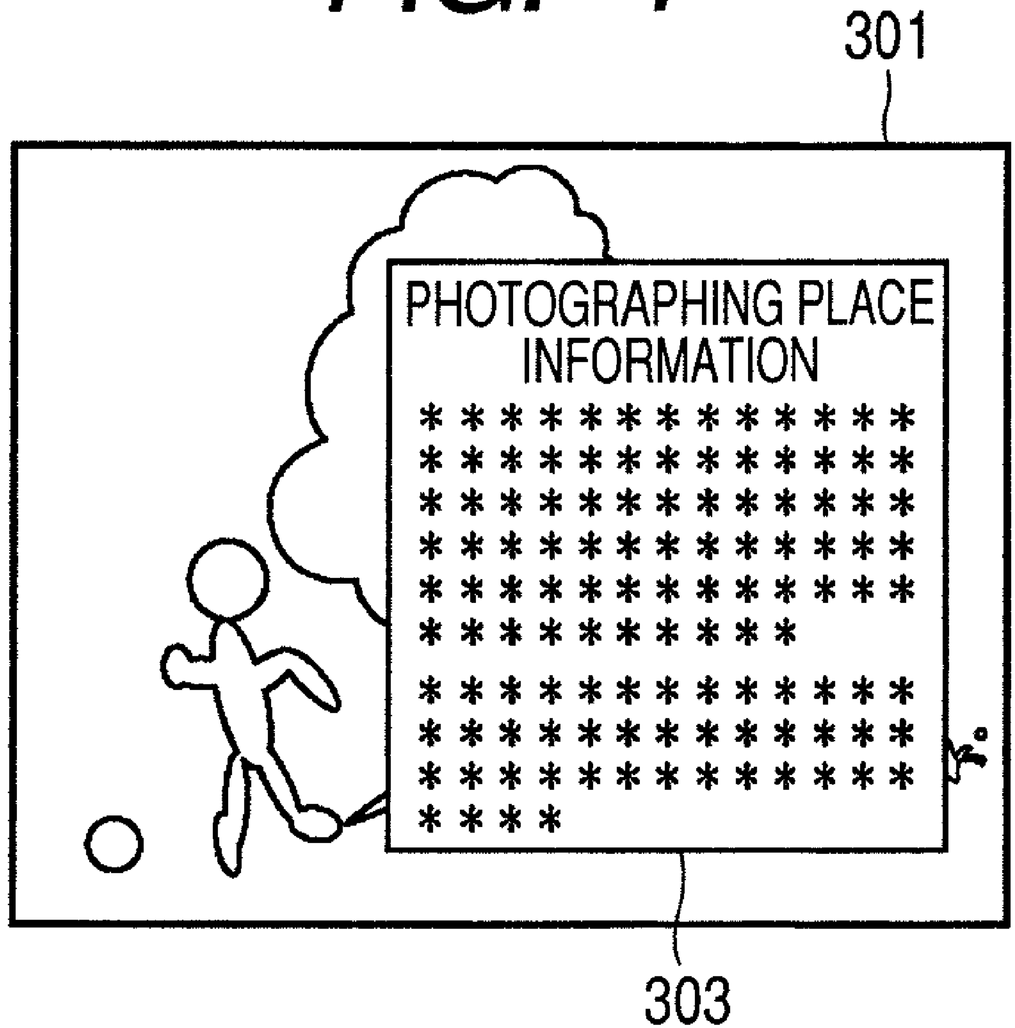
FIG. 4 is a diagram showing an exemplary screen displayed by the output unit.

The output unit 109, which is connected to the synthesization unit 108, displays a display image corresponding to the data synthesized by the synthesization unit 108 on a display screen (not shown) (see FIG. 3 and FIG. 4).

Figure 2:
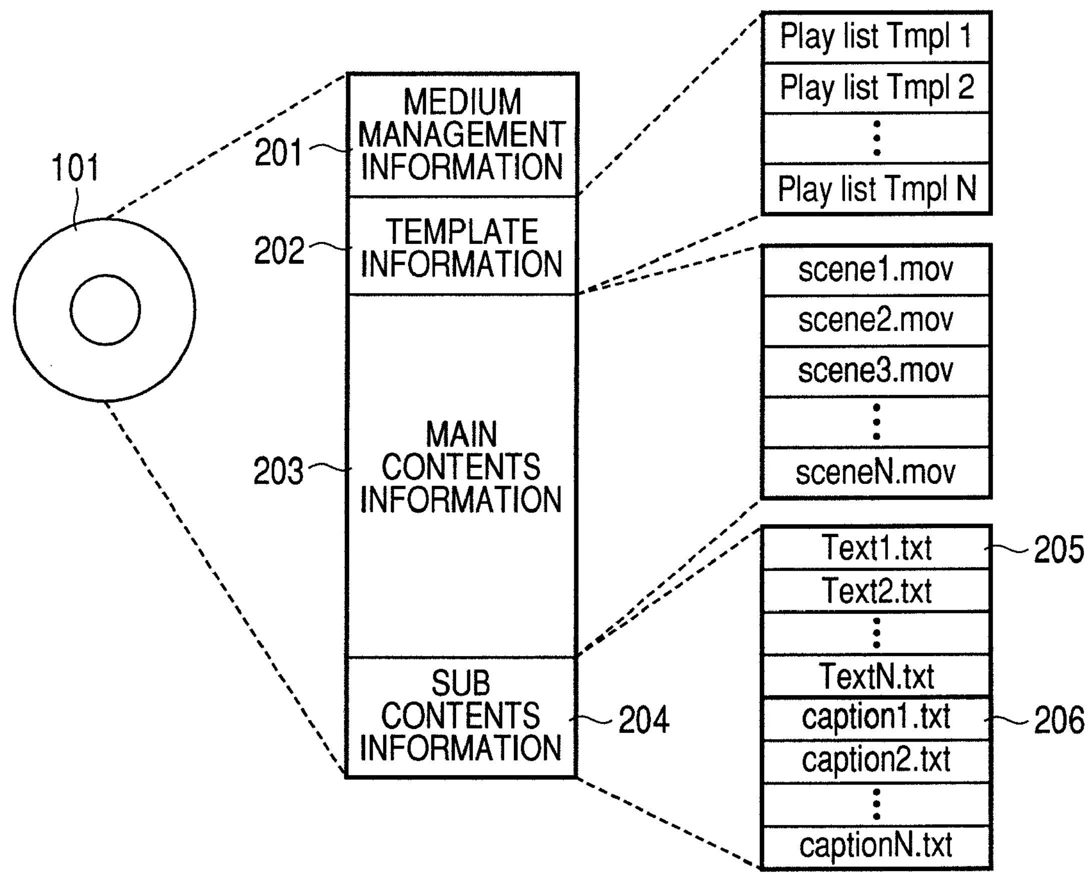
FIG. 2 is a diagram showing an exemplary configuration of a recording medium.

Referring now to FIG. 2, a detailed configuration of the recording medium 101 is described below. FIG. 2 is a diagram showing an exemplary configuration of a recording medium.

The recording medium 101 includes medium management information 201, template information 202, main contents information 203 and sub-contents information 204.

The medium management information 201 is to manage the template information 202, the main contents information 203 and the sub-contents information 204 that are recorded on the recording medium 101. The medium management information 201 is the address information, e.g., to access the template information 202, the main contents information 203 and the sub-contents information 204, respectively.

The template information 202 is the information that is to be a play list template. The template information 202 includes the following template files: "Play list Tmpl1", "Play list Tmpl2", . . . , "Play list TmplN".

The main contents information 203 is the information that is related to the main contents. The main contents information 203 includes movie data files "scene1.mov", "scene2.mov", . . . , "sceneN.mov".

The sub-contents information 204 is the information that is related to the sub-contents. The sub-contents information 204 includes contents explanation data 205 and caption data 206. The contents explanation data 205 includes contents explanation files "Text1.txt", "Text2.txt", . . . , "TextN.txt". The caption data 206 includes caption files "caption1.txt", "caption2.txt", . . . , "captionN.txt".

Each caption file of the caption data 206 includes information as attribute information that indicates synchronization-type contents. The synchronization-type contents include features that they have close relationship with the main contents and thus should be reproduced in synchronization with the main contents. For example, as shown in FIG. 3, the output unit 109 reproduces and displays a movie (main contents) 301 on the basis of the main reproduction request that is input to the operation unit 112, and then reproduces and displays a caption (sub-contents) 302 in coordination with proceeding of the main contents. That is, the caption (sub-contents) is synchronously (coordinately) reproduced and displayed with the movie (main contents).

In addition, each contents explanation file of the contents explanation data 205 includes information as attribute information that indicates event-type contents. The event-type contents include features that they have no close relationship with the main contents and thus should be reproduced without synchronization with the main contents. For example, as shown in FIG. 4, the output unit 109 reproduces and displays a movie (main contents) 301 based on the main reproduction request that is input to the operation unit 112. Then, the output unit 109 displays a contents explanation (sub-contents) 303 when any sub-reproduction request is input to the operation unit 112 or when the main contents reaches at a particular scene. At this moment, the output unit 109 reproduces and displays the contents explanation (sub-contents) 303 without synchronization with the movie (main contents) 301. That is, the output unit 109 continually reproduces and displays the contents explanation (sub-contents) until some event occurs (e.g., a sub-reproduction request based on the user operation). Finally, the reproduction image is updated (or terminated) based on the sub-reproduction request that is input to the operation unit 112. In this way, both reproduction methods of the main contents and the sub-contents will be changed depending on whether the sub-contents are synchronization-type contents or event-type contents.

As shown in FIG. 4, the contents explanation (sub-contents) 303 here includes a feature that it has a significant amount of information. This may result in an inadequate time period for the viewer to read through the contents explanation (sub-contents) 303 displayed, if the sub-contents 303 is automatically switched over to the next information (when the next information automatically reproduced) in synchronization with the movie (main contents) 301. That is, the main contents and the sub-contents could not be reproduced in coordination with the features of the sub-contents.

Thus, if it is determined that the sub-contents are not synchronization-type contents (the sub-contents are event-type contents), then the system controller 110 generates such a control signal that will cause the main contents and the sub-contents to be output (reproduced and displayed) in an asynchronous manner. The system controller 110 controls the drive controller 103, the file management unit 105, the main contents decoder 106, the sub-contents decoder 107 and the synthesization unit 108 via the control signals, respectively. This enables the output unit 109 to reproduce and display the contents explanation (sub-contents) 303 without synchronization with the movie (main contents) 301. Then, the reproduction and display of the contents explanation (sub-contents) can be updated (or terminated) based on the sub-reproduction request that is input to the operation unit 112. During this operation, and when the movie (main contents) reaches at a particular point (e.g., a division point on a file) during reproduction of the contents explanation (sub-contents), the reproduction of the movie is suspended until a subsequent sub-reproduction request is input to the operation unit 112. In this case, once a sub-reproduction request being input, the reproduction of the movie (main contents) will be resumed from the next scene. In this way, when the sub-contents are event-type contents, the main contents and the sub-contents will be reproduced and displayed depending on the event.

On the other hand, if it is determined that the sub-contents are synchronization-type contents (the sub-contents are not event-type contents), then the system controller 110 generates a control signal to output (reproduce and display) the main contents and the sub-contents in a synchronous manner. In this way, when the sub-contents are synchronization-type contents, the movie (main contents) process will be continued and the sub-contents will be reproduced and displayed depending on one of the scene and time.

Figure 5:
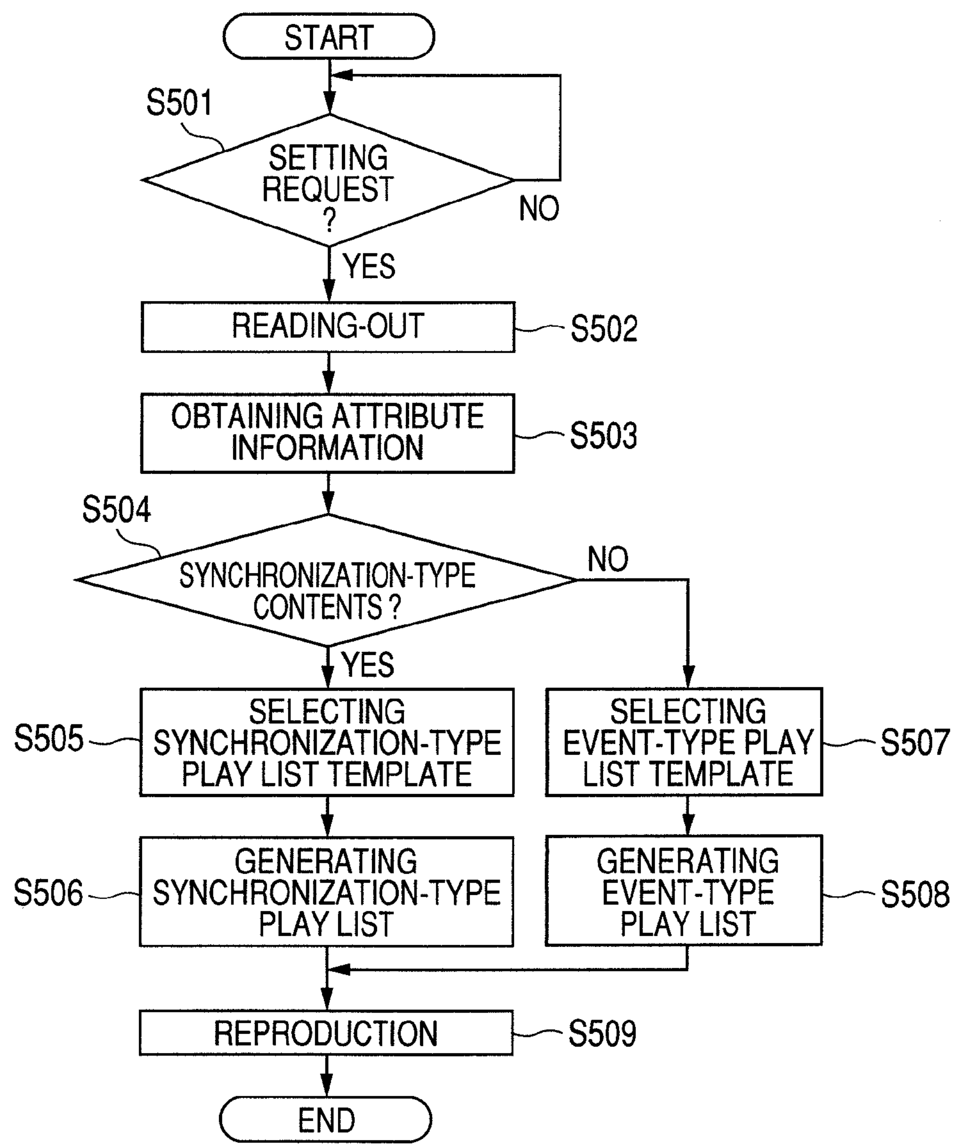
FIG. 5 is a flowchart showing an operational flow of the reproducing apparatus to reproduce main contents and sub-contents.
Figure 6:
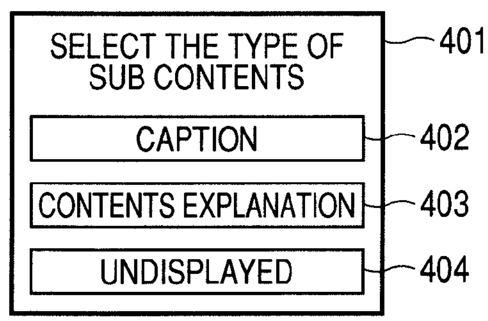
FIG. 6 is a diagram showing an exemplary screen displayed by the output unit.
Figures 7, 8:
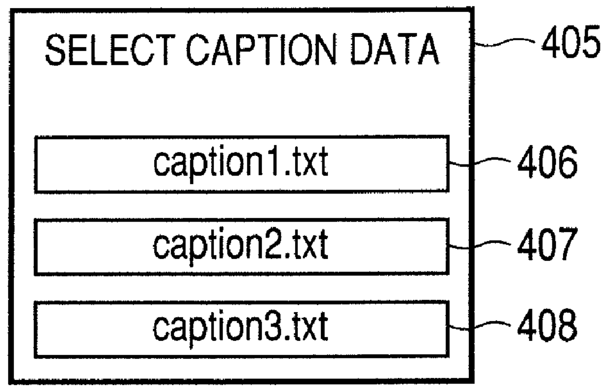
FIG. 7 is a diagram showing an exemplary screen displayed by the output unit.
FIG. 8 is a diagram showing an exemplary description of a synchronization-type play list template.
Figure 9:
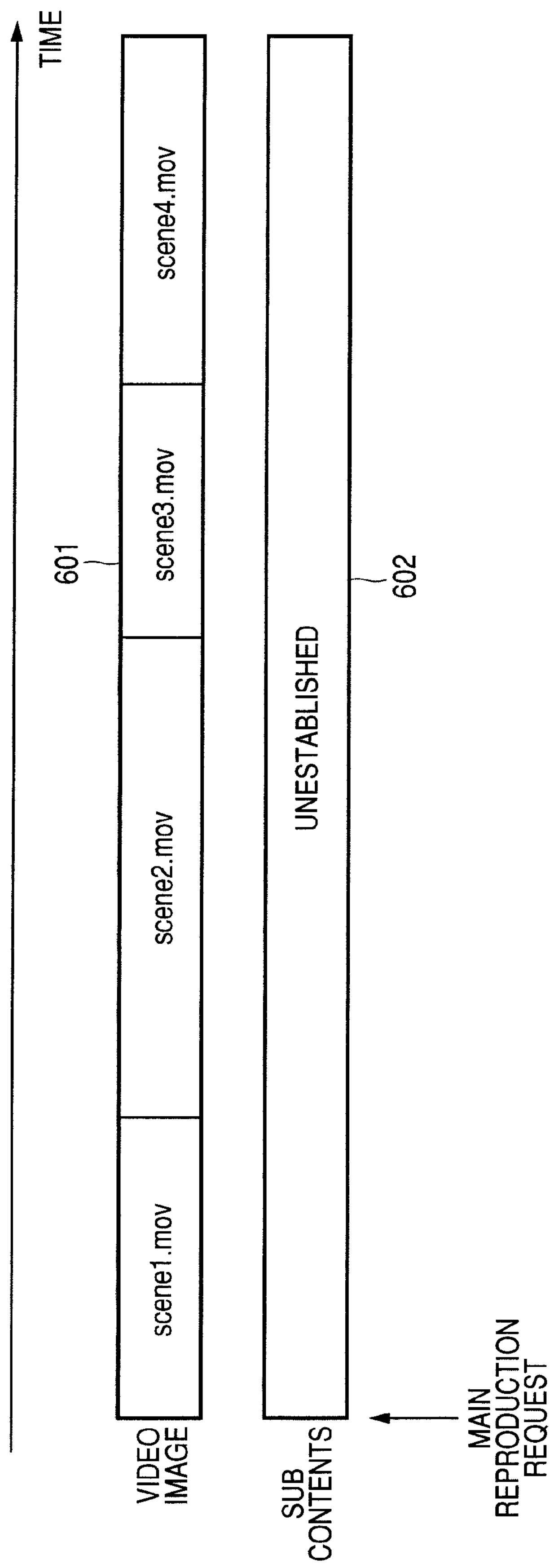
FIG. 9 is a conceptual diagram of a play list template.
Figure 10:
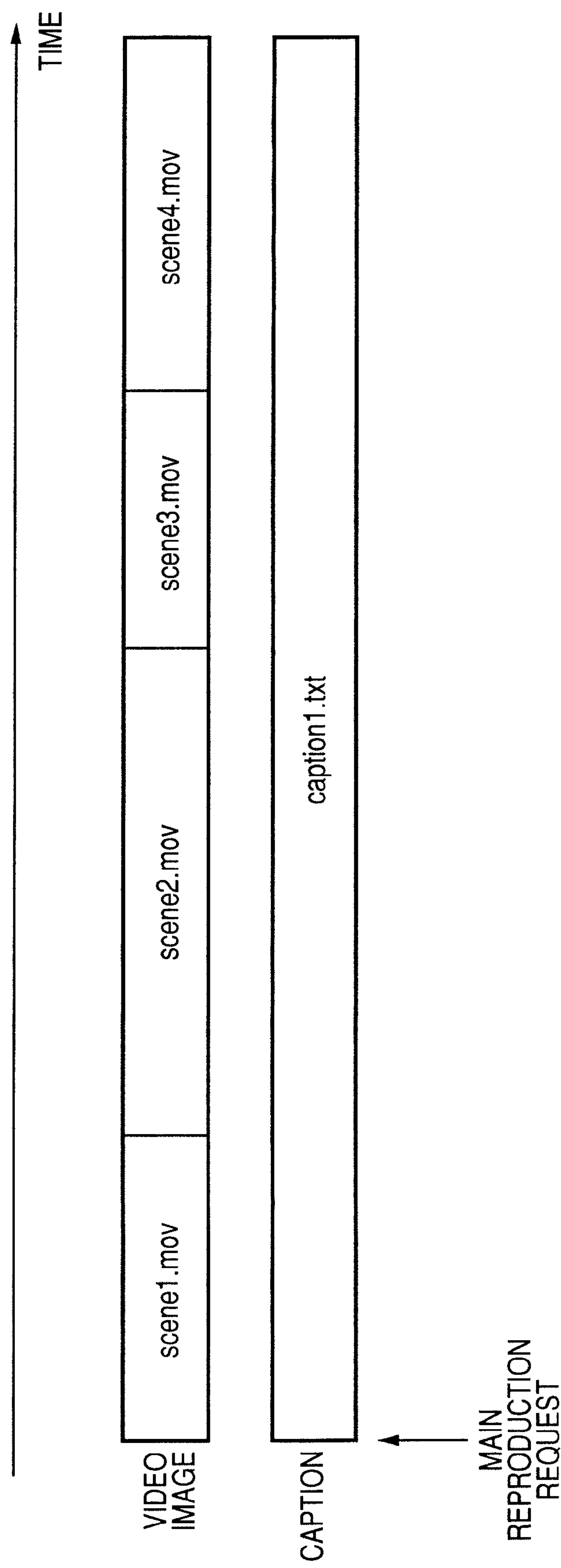
FIG. 10 is a conceptual diagram of a play list.
Figure 11:
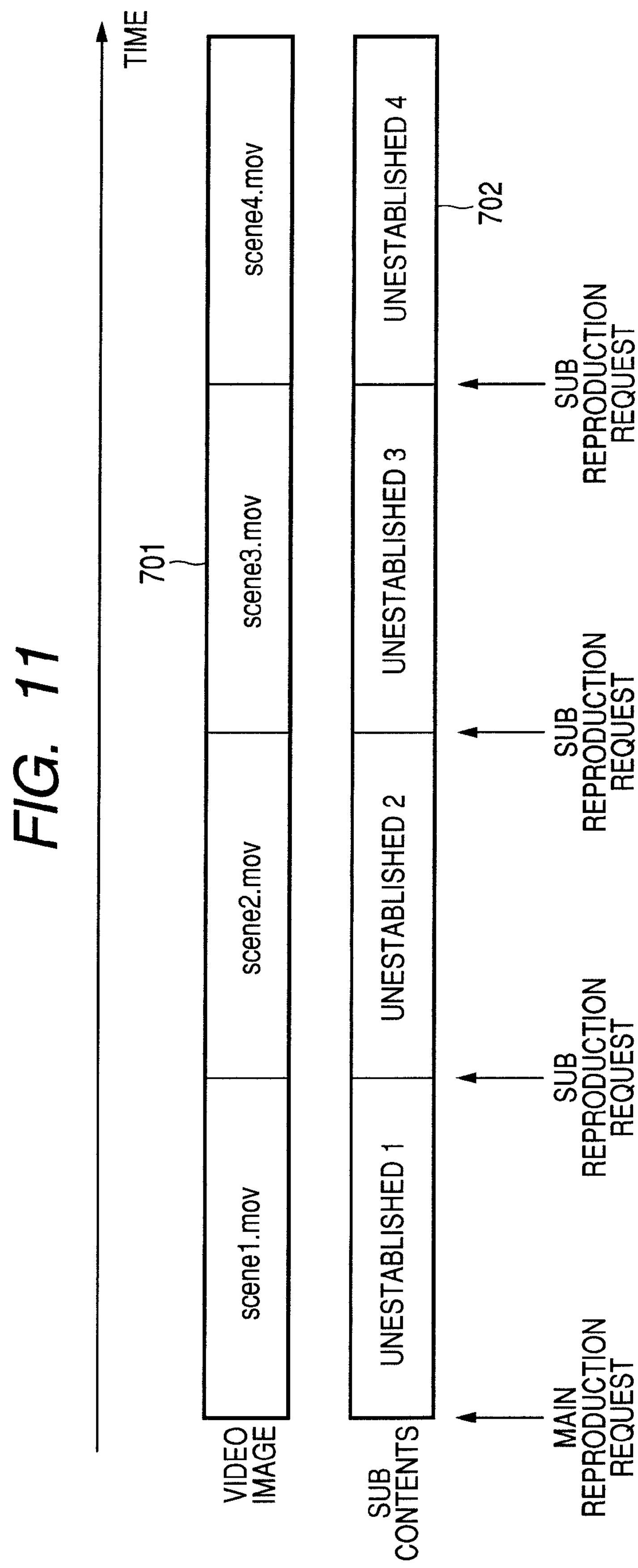
FIG. 11 is a conceptual diagram of a play list template.
Figure 12:
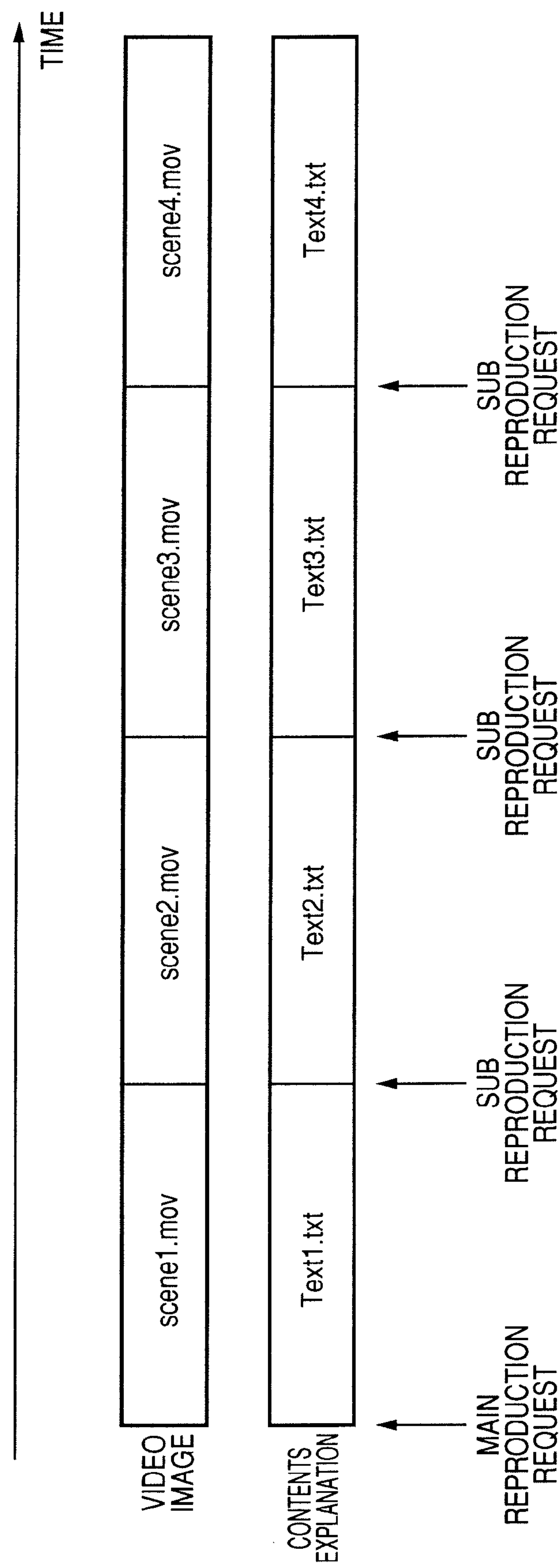
FIG. 12 is a conceptual diagram of a play list.

Referring now to FIG. 5 through FIG. 12, an operational flow of the reproducing apparatus to reproduce main contents and sub-contents is described below. FIG. 5 is a flowchart showing an operational flow of the reproducing apparatus to reproduce main contents and sub-contents. FIG. 6 and FIG. 7 show an exemplary screen displayed by the output unit 109. FIG. 9 and FIG. 11 are conceptual diagrams of a play list template. FIG. 10 and FIG. 12 are conceptual diagrams of a play list.

At step S501, upon acceptance of a setting request to set a play list, the operation unit 112 provides the setting request to the system controller 110. If the setting request is received by the system controller 110, then the system controller 110 determines that the setting request exists, causes the output unit 109 to display a menu (not shown) via the synthesization unit 108, and proceeds to step S502. If the setting request is not received, then the system controller 110 determines that no setting request exists and proceeds to step S501.

At step S502, the system controller 110 obtains the medium management information 201 that is recorded on the recording medium 101. Based on the medium management information 201 obtained, the system controller 110 causes the output unit 109 to display a menu for selecting the type of sub-contents via the synthesization unit 108.

For example, as shown in FIG. 6, the output unit 109 displays a type selection menu 401. In the type selection menu 401 displayed a "caption" button 402, a "contents explanation" button 403 and an "undisplayed" button 404. In the type selection menu 401, any one of the "caption" button 402, "contents explanation" button 403 and "undisplayed" button 404 will be clicked based on the instruction that is input to the operation unit 112.

For example, as shown in FIG. 7, once the "caption" button 402 being clicked, a sub-contents selection screen 405 is displayed. In the sub-contents selection screen 405 displayed a file name of a caption file as a button corresponding to the "caption" button 402. That is, for example, a "caption1.txt" button 406, a "caption2.txt" button 407 and a "caption3.txt" button 408 are displayed in the sub-contents selection screen 405. In the sub-contents selection screen 405, any one of the "caption1.txt" button 406, the "caption2.txt" button 407 and the "caption3.txt" button 408 will be clicked based on the instruction that is input to the operation unit 112.

In response to a click on any one of the plurality of buttons 406-408, the system controller 110 controls the drive controller 103 and the disc I/F 102. Consequently, the sub-contents information and the main contents information that are selected corresponding to the clicked buttons 406-408 will be read out from the recording medium 101 to the disc I/F 102 together with the template information.

The disc I/F 102 provides the information that is read out from the recording medium 101 (the template information, main contents information and sub-contents information) to the error correction unit 104. The error correction unit 104 demodulates the read-out information while correcting any data error in the demodulated data. The error correction unit 104 provides the demodulated/corrected data (a digital data train) to the file management unit 105.

At step S503, the file management unit 105 obtains main contents identification information, sub-contents identification information, attribute information and template information from the demodulated/corrected data. That is, the file management unit 105 obtains the main contents identification information on the basis of the main contents information. The main contents identification information is the information to identify the main contents, and represents, e.g., a file name of a movie data file as described below. The file management unit 105 also obtains the sub-contents identification information and the attribute information on the basis of the sub-contents information. The sub-contents identification information is the information to identify the sub-contents, and represents, e.g., a file name of a caption file or a contents explanation file as described below. The attribute information is the information that is related to the features of the sub-contents. The template information is the information that is to be a play list template, and includes multiple play list template files (see FIG. 9 and FIG. 11).

At step S504, the file management unit 105 determines whether or not the selected sub-contents are synchronization-type contents, on the basis of the attribute information.

For example, consider the case where the "caption" button 402 is clicked in the type selection menu 401 shown in FIG. 6, and any one of the plurality of buttons 406-408 is clicked in the sub-contents selection screen 405 shown in FIG. 7. In this case, the file management unit 105 determines that the caption (sub-contents) is synchronization-type contents, on the basis of the attribute information.

Alternatively, for example, consider the case where the "contents explanation" button 403 is clicked in the type selection menu 401 shown in FIG. 6, and any one of the plurality buttons is clicked in the sub-contents selection screen (similar to that of FIG. 7). In this case, the file management unit 105 determines that the contents explanation (sub-contents) is not a synchronization-type content, on the basis of the attribute information.

If the sub-contents are determined to be synchronization-type contents, then the file management unit 105 proceeds to step S505; if not, then it proceeds to step S507.

At step S505, based on the attribute information, the file management unit 105 selects an appropriate play list template file for the features of the sub-contents from the template information. That is, the file management unit 105 selects information related to the synchronization-type play list template from the template information.

The synchronization-type play list template here represents a play list template that corresponds to the synchronization-type contents. As shown in FIG. 8, the synchronization-type play list template is described in, e.g., SMIL (Synchronized Multimedia Integrated Language). In the synchronization-type play list template shown in FIG. 8, a video image (main contents) is designated as "video src=", and the description related to a part, in which sub-contents are designated, remains unestablished (indicated here as "unestablished"). The synchronization-type play list template of FIG. 8 is conceptually shown in FIG. 9. FIG. 9 is a conceptual diagram showing how the synchronization-type play list template is described. In FIG. 9, time is shown to advance to the right. As shown in FIG. 9, the synchronization-type play list template includes a description 601 for sequentially reproducing movie data files "scene1.mov", "scene2.mov", "scene3.mov" and "scene4.mov". The synchronization-type play list template also includes another description 602 that indicates unestablishment of sub-contents.

At step 506, the file management unit 105 outputs the selected play list template file as well as the main contents identification information, the sub-contents identification information and the attribute information to the play list generation unit 111.

The play list generation unit 111 generates a play list on the basis of the selected play list template file as well as the main contents identification information, the sub-contents identification information and the attribute information. The play list is to control each reproduction procedure of the main contents and the sub-contents. That is, the play list generation unit 111 determines each reproduction procedure of the main contents and the sub-contents in consideration of the features of the sub-contents, and accordingly generates a play list.

For example, the play list generation unit 111 embeds the sub-contents identification information into the synchronization-type play list template shown in FIG. 9 to generate the play list shown in FIG. 10. In the play list shown in FIG. 10, the movie data files "scene1.mov", "scene2.mov", "scene3.mov" and "scene4.mov" are described to be reproduced sequentially. Additionally, in this play list, a caption file "caption1.txt" is described to be reproduced in synchronization with the movie.

In addition, the play list generation unit 111 may embed the main contents identification information and the sub-contents identification information into the synchronization-type play list template to generate a play list.

At step S507, based on the attribute information, the file management unit 105 selects an appropriate play list template file for the features of the sub-contents from the template information. That is, the file management unit 105 selects information related to an event-type play list template from the template information.

The event-type play list template here represents a play list template that corresponds to the event-type contents. The event-type play list template is, as in FIG. 8, described in SMIL (Synchronized Multimedia Integrated Language). The event-type play list template is conceptually shown in FIG. 11. FIG. 11 is a conceptual diagram showing the description of the event-type play list template. In FIG. 11, time is shown to advance to the right. As shown in FIG. 11, the event-type play list template includes a description 701 for sequentially reproducing movie data files "scene1.mov", "scene2.mov", "scene3.mov" and "scene4.mov". The event-type play list template also includes another description 702 that indicates unestablishment of sub-contents.

For the event-type play list template, the description 702 which switches sub-contents among "unestablished 1" through "unestablished 4" is different from that of the synchronization-type play list template. That is, timing of switching the sub-contents "unestablished 1" through "unestablished 4" is triggered by the input of a sub-reproduction request to the operation unit 112, not by the switching between movies (main contents). For example, it is described that the process will not immediately proceed to the next video image data "scene2.mov", even if the reproduction of the movie data file "scene1.mov" is completed, and that the process may continually reproduce the sub-contents "unestablished 1" (unestablished). That is, it is described that the reproduction of the next movie data file "scene2.mov" is suspended until any sub-reproduction request is input to the operation unit 112. It is also described that upon a sub-reproduction request being input to the operation unit 112, the process then proceed to the reproduction of the next movie data file "scene2.mov" and the next sub-contents "unestablished 2".

At step S508, the file management unit 105 outputs the selected play list template file as well as the main contents identification information, the sub-contents identification information and the attribute information to the play list generation unit 111.

The play list generation unit 111 generates a play list on the basis of the selected play list template file, the main contents identification information, the sub-contents identification information and the attribute information. The play list is to control each reproduction procedure of the main contents and the sub-contents. That is, the play list generation unit 111 determines each reproduction procedure of the main contents and the sub-contents in consideration of the features of the sub-contents, and accordingly generates a play list.

For example, the play list generation unit 111 embeds main contents identification information and sub-contents identification information into the event-type play list template shown in FIG. 11 to generate the play list shown in FIG. 12. In the play list shown in FIG. 12, the movie data files "scene1.mov", "scene2.mov", "scene3.mov" and "scene4.mov" are described to be reproduced sequentially. Additionally, in this play list, contents explanation files "Text1.txt", "Text2.txt", "Text3.txt" and "Text4.txt" are described to be reproduced without synchronization with the movie.

That is, timing of switching the contents explanations (sub-contents) is triggered by the input of a sub-reproduction request to the operation unit 112, not by the switching between movie (main contents) scenes. For example, it is described that the process will not immediately proceed to the next video image data "scene2.mov", even if the reproduction of the movie data file "scene1.mov" is completed, and that the process may continually reproduce the contents explanation file "Text1.txt". That is, it is described that the reproduction of the next movie data file "scene2.mov" is suspended until any sub-reproduction request is input to the operation unit 112. It is also described that upon a sub-reproduction request being input to the operation unit 112, the process then proceed to the reproduction of the next movie data file "scene2.mov" and the next contents explanation file "Text2.txt".

At step S509, the system controller 110 receives information related to a play list from the play list generation unit 111. Based on the play list, the system controller 110 controls the file management unit 105, the main contents decoder 106, the sub-contents decoder 107 and the synthesization unit 108, respectively, to reproduce the main contents and the sub-contents.

For example, the operation unit 112 accepts one of a main reproduction request and a sub-reproduction request. The system controller 110 receives information related to one of the main reproduction request and the sub-reproduction request from the operation unit 112, and generates a read control signal on the basis of the information that is related to one of the main reproduction request and the sub-reproduction request and the play list. The system controller 110 provides the read control signal to the drive controller 103.

The drive controller 103 drives, e.g., an optical pickup or a motor of the disc I/F 102 on the basis of the read control signal. Consequently, the drive controller 103 causes the disc I/F 102 to read out the information recorded on the recording medium 101 (the template information, the main contents information and the sub-contents information).

The disc I/F 102 provides the information that is read out from the recording medium 101 to the error correction unit 104. The error correction unit 104 demodulates the read information while correcting any data error in the demodulated data. The error correction unit 104 provides the demodulated/corrected data (a digital data train) to the file management unit 105.

The file management unit 105 provides the demodulated/corrected data to the main contents decoder 106 and the sub-contents decoder 107. The main contents decoder 106 extracts and decodes the main contents information. The sub-contents decoder 107 extracts and decodes the sub-contents information. The synthesization unit 108 receives the decoded main contents information from the main contents decoder 106 and the decoded sub-contents information from the sub-contents decoder 107. The synthesization unit 108 synthesizes the main contents information and the sub-contents information as displayable data, respectively.

The output unit 109 displays the data that is synthesized by the synthesization unit 108 in a display screen (not shown). That is, the output unit 109 reproduces and displays the movie (main contents) 301 and the caption (sub-contents) 302 in a synchronous manner (see FIG. 3). Alternatively, the output unit 109 reproduces and displays the movie (main contents) 301 and the contents explanation (sub-contents) 303 (see FIG. 4). In addition to this, the output unit 109 also updates (or terminates) the reproduction and display of the contents explanation (sub-contents) 303 on the basis of the sub-reproduction request, without synchronization with the movie (main contents) 301. Consequently, reproduction is made according to the play list.

As described above, the features of the sub-contents can be reflected to the play list. This enables the sub-contents to be reproduced in synchronization with the main contents when the sub-contents are synchronization-type contents. This also enables the sub-contents to be reproduced without synchronization to the main contents when the sub-contents are event-type contents. That is, both reproduction methods of the main contents and the sub-contents will be changed depending on whether the sub-contents are synchronization-type contents or event-type contents. That is, it is possible to reproduce the main contents and the sub-contents in a reproduction manner corresponding to the features of the sub-contents.

In addition, in the event-type play list template shown in FIG. 11, each description of the main contents 601 and 701 may be unestablished. Alternatively, in each description of the main contents 601 and 701, multiple movie data files that are recorded on the recording medium 101 may be described to be reproduced randomly.

A play list may be recorded on the recording medium 101. In this case, the disc I/F 102 may ignore the play list so that it is not read out. Alternatively, if a play list has been read by the disc I/F 102, the system controller 110 may use the other play list that has been generated by the play list generation unit 111 in preference to the list read by the disc I/F 102.

Additionally, the sub-contents information may be recorded in a different recording medium than the recording medium 101 in which main contents information are recorded. For example, recorded in the recording medium 101 are URLs for accessing the sub-contents information, which may be recorded on a recording medium (e.g., a hard disk) that is contained in a file server corresponding to an URL on a network.

Additionally, the attribute information may be recorded on a different recording medium than that of the sub-contents information in association with the sub-contents information (as part of sub-contents information).

Further, the play list may be described in a different form than SMIL.

Second Exemplary Embodiment

Figure 13:
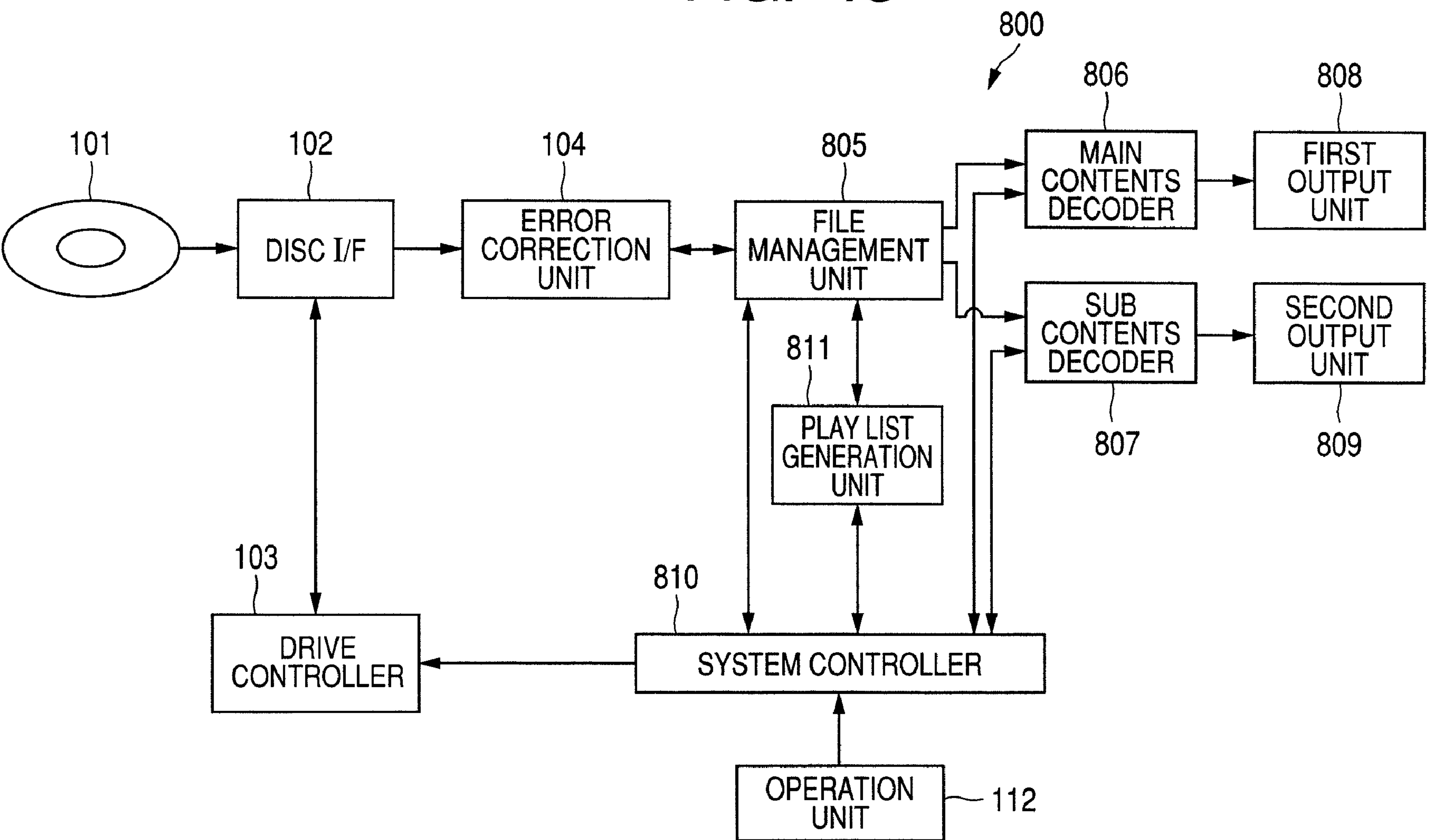
FIG. 13 is a block diagram showing an exemplary configuration of a video image reproducing apparatus according to an aspect of a second exemplary embodiment of the present invention.

Referring now to FIG. 13, a video image reproducing apparatus according to an aspect of a second exemplary embodiment of the present invention is described below. FIG. 13 is an exemplary configuration diagram of the video image reproducing apparatus according to the second exemplary embodiment. Hereinbelow, different parts from the video image reproducing apparatus of the first exemplary embodiment will be mainly described, and description of similar parts thereto will be omitted.

The video image reproducing apparatus 800 enables the reproduction of, e.g., a video image recorded on a recording medium 801.

The recording medium 801 records the information including main contents information and sub-contents information. The main contents information is the information that is related to the main contents (including the main contents themselves). The main contents are essential contents which include a video image. The main contents are, e.g., self-taken record pictures. The sub-contents information is the information that is related to the sub-contents (including the sub-contents themselves). The sub-contents are the contents associated with the main contents, including music, etc.

The video image reproducing apparatus 800 includes a file management unit (attribute information obtaining unit) 805, a main contents decoder 806, a sub-contents decoder 807, a first output unit 808, a second output unit 809, a system controller 810 and a play list generation unit 811.

The file management unit 805 obtains main contents identification information, sub-contents identification information, attribute information and template information from the demodulated/corrected data, respectively. The attribute information is the information that is related to the features of the sub-contents, and includes information that indicates quick tempo-type contents (or slow tempo-type contents). The quick tempo-type contents include a feature that they have a quick tempo. The slow tempo-type contents include a feature that they have a slow tempo.

The play list generation unit 811 selects main contents and sub-contents in consideration of the features of the sub-contents, while determining each reproduction procedure of the main contents and the sub-contents to generate a play list accordingly.

The system controller 810 receives information related to a play list from the play list generation unit 811. Based on the play list, the system controller 810 controls the file management unit 805, the main contents decoder 806 and the sub-contents decoder 807, respectively.

Consequently, the first output unit 808 receives the decoded main contents information from the main contents decoder 806. The first output unit 808 reproduces and displays record pictures (main contents) in a display screen (not shown).

Additionally, the second output unit 809 receives the decoded sub-contents information from the sub-contents decoder 807. The first output unit 808 reproduces and outputs music (sub-contents) to a speaker (not shown).

Figure 14:
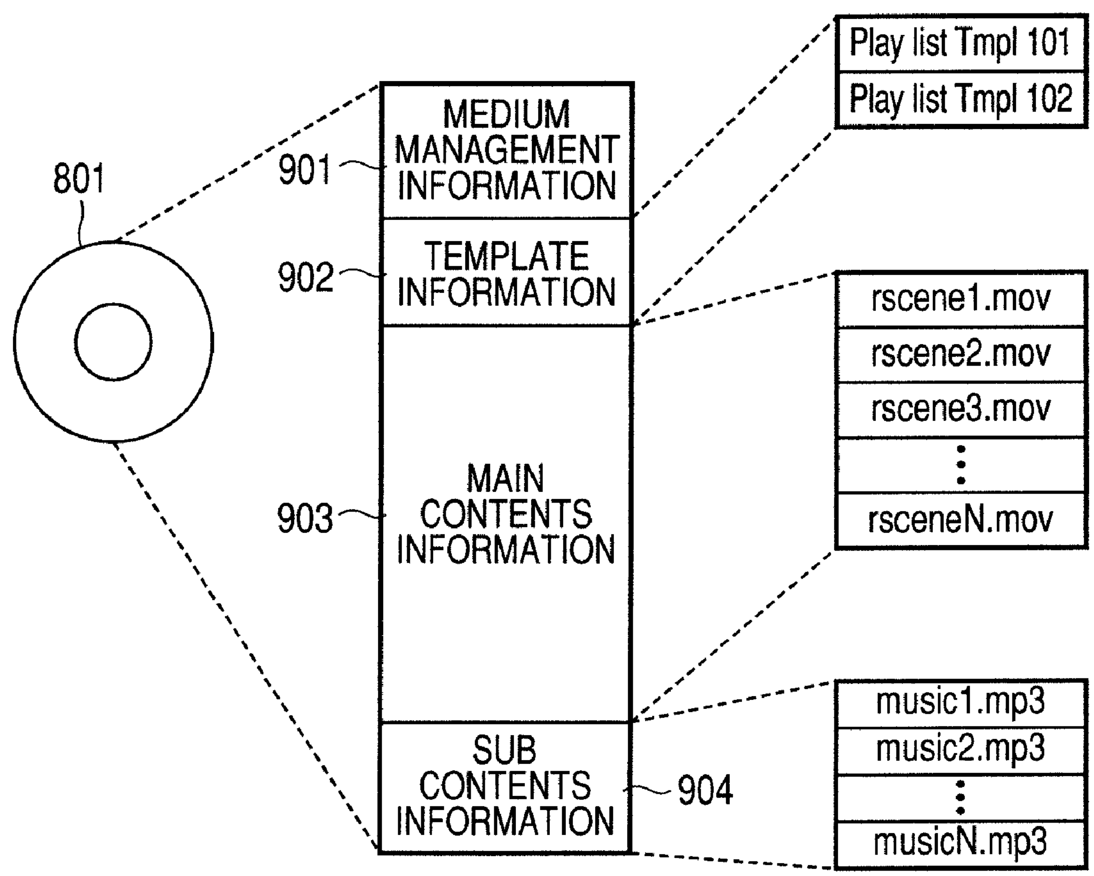
FIG. 14 is a diagram showing an exemplary configuration of a recording medium.

Referring now to FIG. 14, a detailed configuration of the recording medium 801 is described below. FIG. 14 is a diagram showing an exemplary configuration of the recording medium.

The recording medium 801 includes medium management information 901, template information 902, main contents information 903 and sub-contents information 904.

The medium management information 901 is to control the template information 902, the main contents information 903, and the sub-contents information 904 that are recorded on the recording medium 801. The medium management information 901 is the address information, e.g., to access the template information 902, the main contents information 903 and the sub-contents information 904, respectively.

The template information 902 is the information that is to be a play list template. The template information 902 includes template files "Play list Tmpl101", "Play list Tmpl102", . . . , "Play list Tmpl10N".

The main contents information 903 is the information that is related to the main contents. The main contents information 903 includes record picture data files "rscene1.mov", "rscene2.mov", . . . , "rsceneN.mov".

The sub-contents information 904 is the information that is related to the sub-contents. The sub-contents information 904 includes music data. The music data includes music files "music1.mp3", "music2.mp3", . . . , "musicN.mp3".

Each music file of the music data includes information as attribute information that indicates quick tempo-type contents (or slow tempo-type contents) The quick tempo-type contents include features that they have a quick tempo and thus are suitable for the main contents with shorter reproduction time. For example, the first output unit 808 and the second output unit 809 synchronously (coordinately) reproduces and displays a short reproduction time record picture (main contents) and quick tempo music (sub-contents) based on the main reproduction request that is input to the operation unit 112. Alternatively, the first output unit 808 and the second output unit 809 synchronously (coordinately) reproduces and displays a long reproduction time record picture (main contents) and slow tempo music (sub-contents) on basis of the main reproduction request that is input to the operation unit 112.

The quick tempo-type contents (quick tempo music) include a feature that they are suitable for the shorter reproduction time main contents. Therefore, if the quick tempo music (sub-contents) is reproduced in synchronization with the long reproduction time record pictures (main contents), an impression that the reproduced picture are not coordinate with the music could be given to the viewer, thereby inducing stress for the viewer.

Additionally, the slow tempo-type contents (slow tempo music) include a feature that they are suitable for the longer reproduction time main contents. Therefore, if the slow tempo music (sub-contents) is reproduced in synchronization with the short reproduction time record pictures (main contents), an impression that the reproduced pictures are not coordinate with the music could be given to the viewer, thereby also inducing stress for the viewer. That is, the main contents and the sub-contents could not be reproduced in coordination with the features of the sub-contents.

Thus, if it is determined that the sub-contents are quick tempo-type contents, then the system controller 810 generates such a control signal that will cause the short reproduction time main contents and the quick tempo sub-contents to be output. The system controller 810 controls the file management unit 805, the main contents decoder 806 and the sub-contents decoder 807 via the control signal, respectively.

This causes the first output unit 808 to reproduce and display the short reproduction time record pictures (main contents) on the basis of the main reproduction request that is input to the operation unit 112. Additionally, the second output unit 809 reproduces and outputs the quick tempo music (sub-contents) on the basis of the main reproduction request that is input to the operation unit 112.

On the other hand, if it is determined that the sub-contents are slow tempo-type contents (the sub-contents are not quick tempo-type contents), then the system controller 810 generates such a control signal that will cause the long reproduction time main contents and the slow tempo sub-contents to be output. The system controller 810 controls the file management unit 805, the main contents decoder 806 and the sub-contents decoder 807 via the control signal, respectively. This causes the first output unit 808 to reproduce and display the long reproduction time record pictures (main contents) on the basis of the main reproduction request that is input to the operation unit 112. Additionally, the second output unit 809 reproduces and outputs the slow tempo music (sub-contents) on the basis of the main reproduction request that is input to the operation unit 112. In this way, combinations of the main contents and the sub-contents can be changed depending on the features of the sub-contents.

Figure 15:
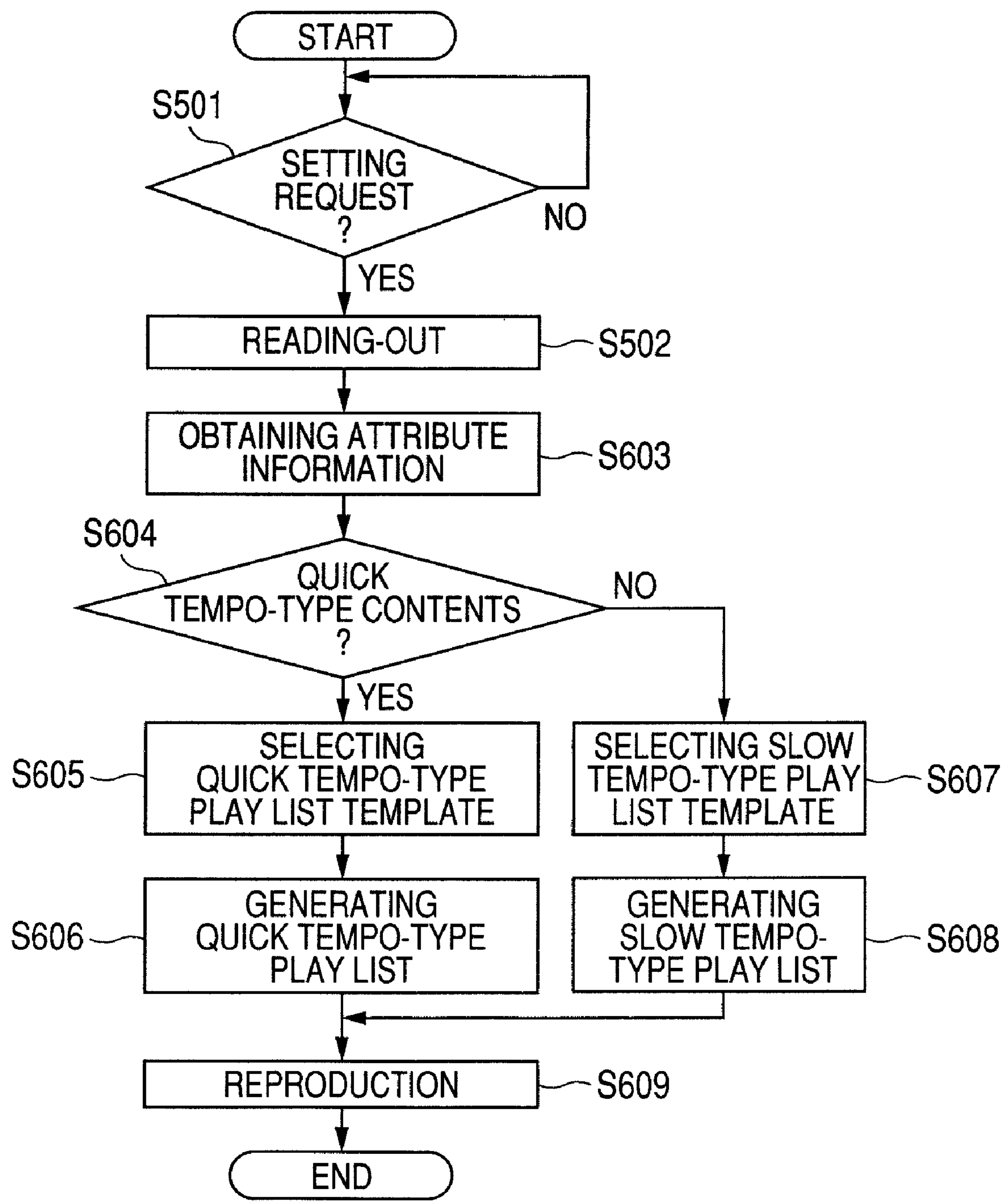
FIG. 15 is a flowchart showing an operational flow of the reproducing apparatus to reproduce main contents and sub-contents.
Figure 16:
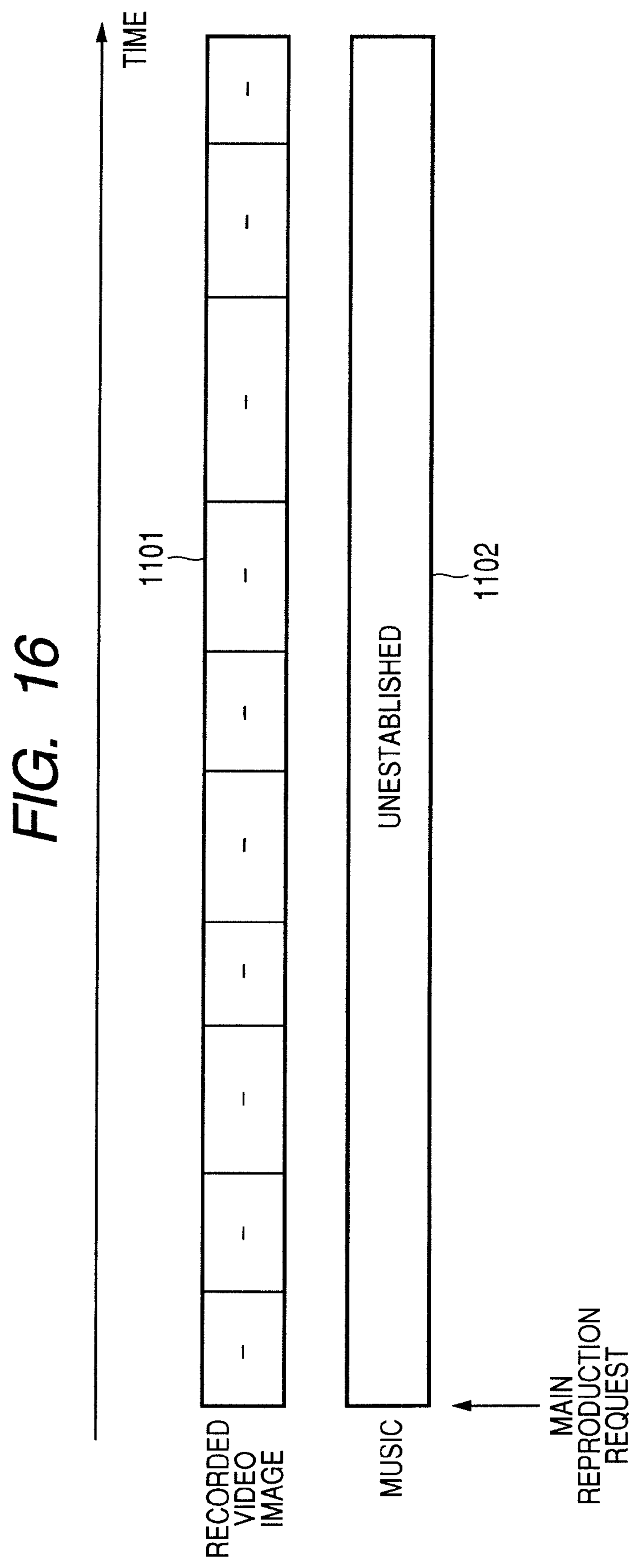
FIG. 16 is a conceptual diagram of a play list template.
Figure 17:
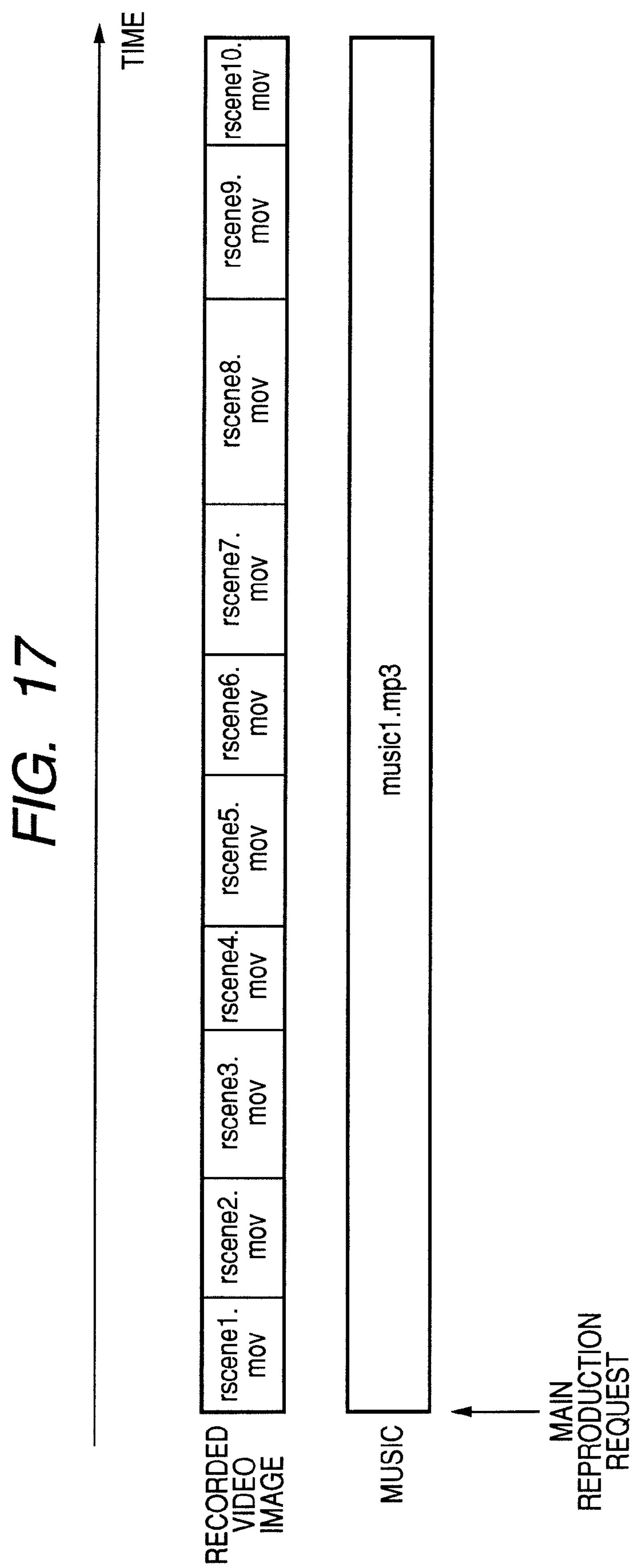
FIG. 17 is a conceptual diagram of a play list.
Figure 18:
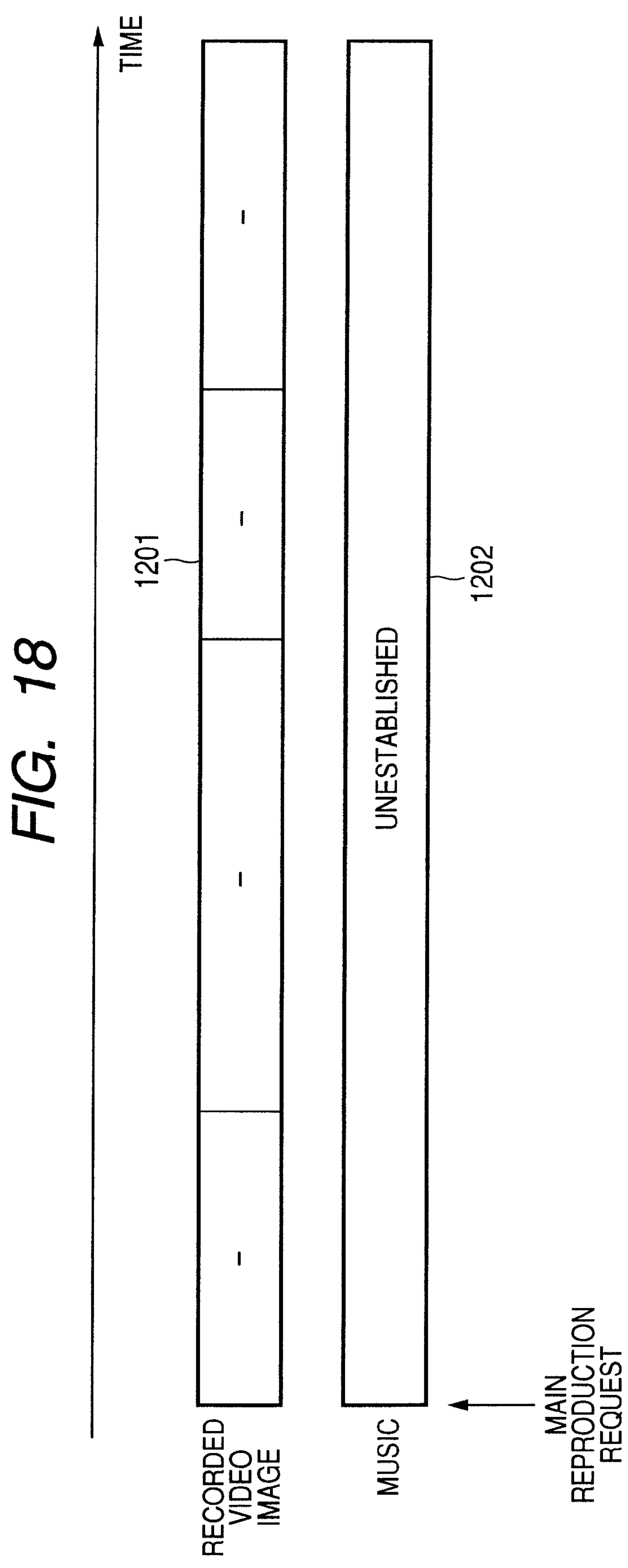
FIG. 18 is a conceptual diagram of a play list template.
Figure 19:
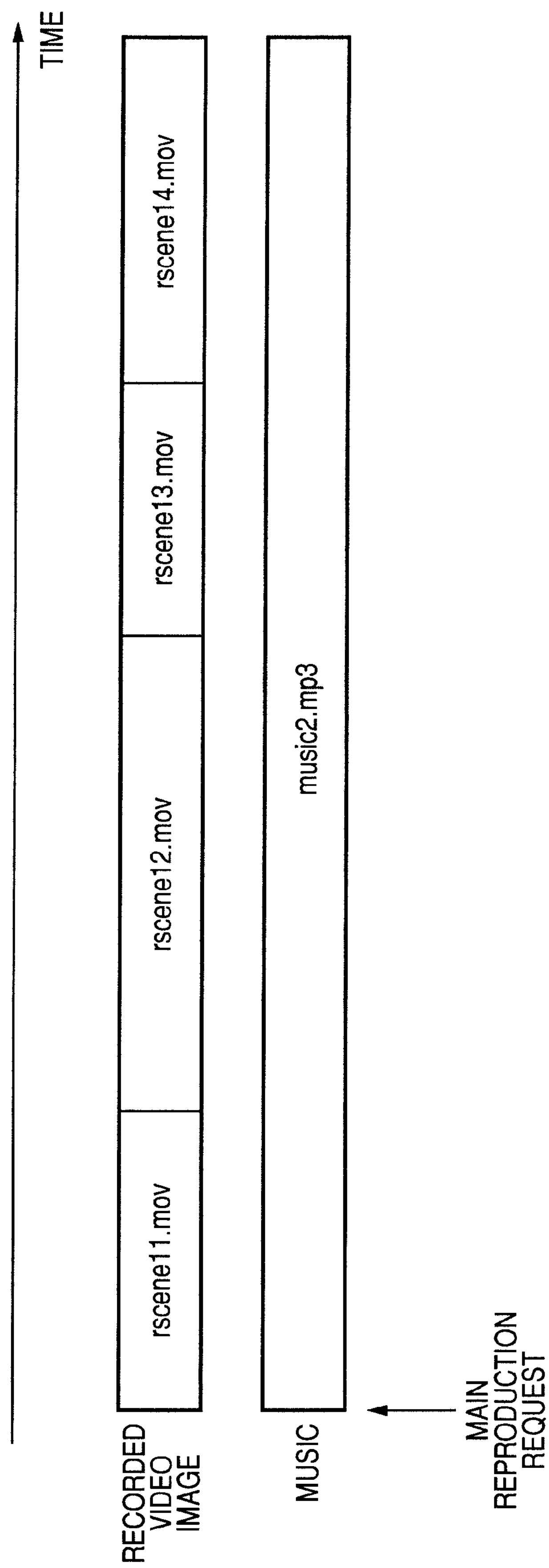
FIG. 19 is a conceptual diagram of a play list.
Figure 20:
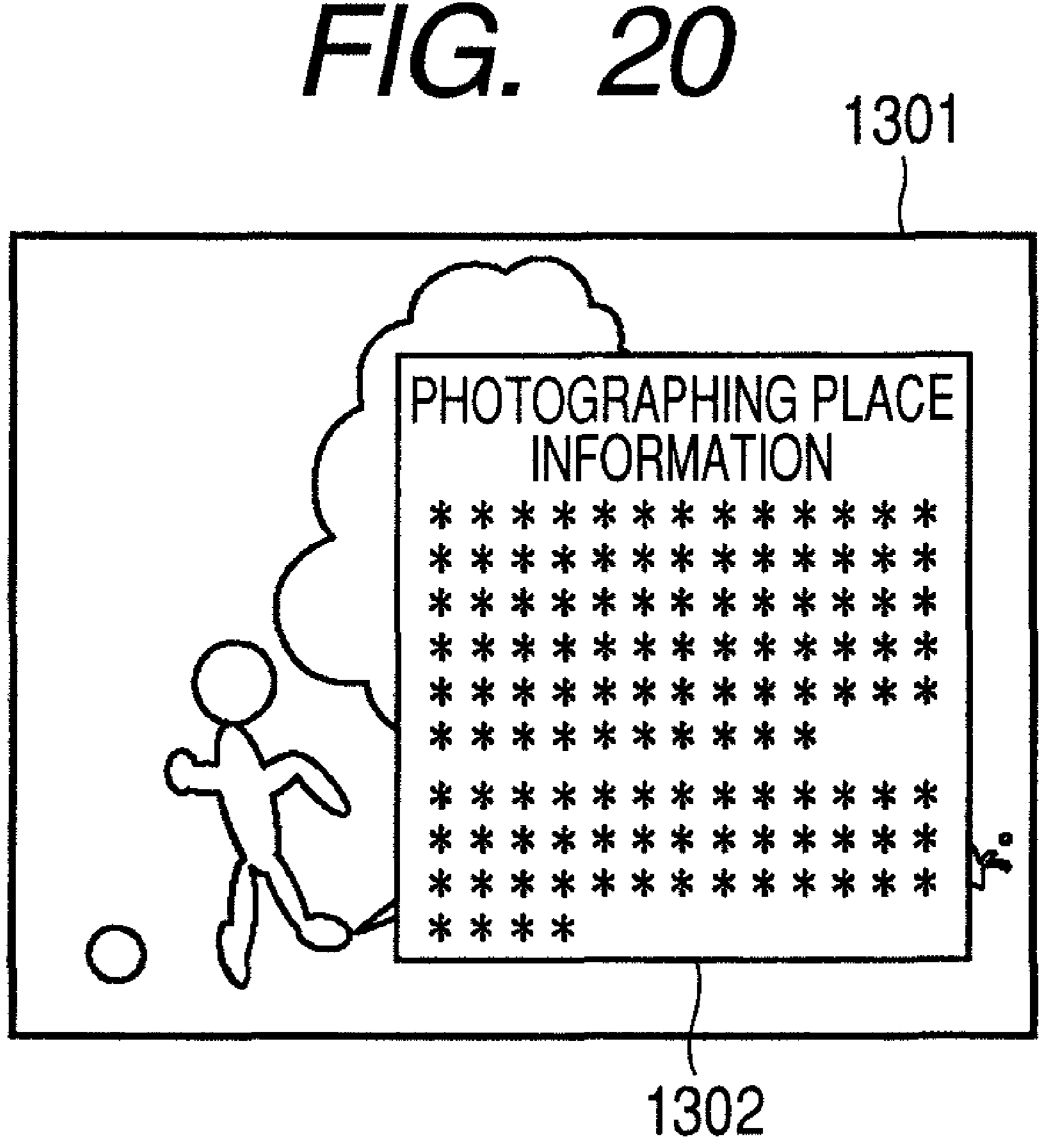
FIG. 20 is a diagram for describing problems to be solved by the present invention.

Referring now to FIG. 15 through FIG. 19, an operational flow of the reproducing apparatus to reproduce main contents and sub-contents is described below. FIG. 15 is a flowchart showing an operational flow of the reproducing apparatus to reproduce main contents and sub-contents. FIG. 16 and FIG. 18 are conceptual diagrams of a play list template. FIG. 17 and FIG. 19 are conceptual diagrams of a play list. Hereinbelow, different parts from the operations of the first exemplary embodiment will be mainly described, and description of similar parts thereto will be omitted.

At step S603, the file management unit 805 obtains main contents identification information, sub-contents identification information, attribute information and template information from the demodulated/corrected data, respectively. The attribute information is the information that is related to the features of the sub-contents, and includes information that indicates, e.g., quick tempo-type contents (or slow tempo-type contents). The quick tempo-type contents include a feature that they have a quick tempo. The slow tempo-type contents include a feature that they have a slow tempo.

In addition, the file management unit 805 may obtain attribute information analyzing a tempo of the sub-contents to be reproduced. For example, the file management unit 805 detects a periodic change (rhythm) in a music signal by the rise or fall in the music signal and calculates the tempo from a signal that is characteristically extracted as such rhythm and time information related to the contents. Then, the file management unit 805 generates and obtains attribute information by comparing the calculated tempo with a predetermined threshold.

At step S604, the file management unit 805 determines whether or not the selected sub-contents are quick tempo-type contents on the basis of the attribute information.

If it is determined that the sub-contents are quick tempo-type contents, then the file management unit 805 proceeds to step S605; if not, then it proceeds to step S607.

As step S605, based on the attribute information, the file management unit 105 selects an appropriate play list template file for the features of the sub-contents from the template information. That is, the file management unit 105 selects information related to a quick tempo-type play list template from the template information.

The quick tempo-type play list template here represents a play list template that corresponds to the quick tempo-type contents. For example, as shown in FIG. 16, the quick tempo-type play list template includes a description 1101 that indicates unestablishment of record picture data files. The description 1101 includes a description that indicates switching between files for reproduction occurs at each timing shown in vertical lines (at each short time interval). The quick tempo-type play list template also includes another description 602 that indicates unestablishment of sub-contents.

At step S606, the file management unit 805 outputs the selected play list template file as well as the main contents identification information, the sub-contents identification information and the attribute information to the play list generation unit 811.

The play list generation unit 811 generates a play list on the basis of the selected play list template file as well as on the main contents identification information, the sub-contents identification information and the attribute information. The play list is to control each reproduction procedure of the main contents and the sub-contents. That is, the play list generation unit 811 selects main contents and sub-contents in consideration of the features of the sub-contents, while determining each reproduction procedure of the main contents and the sub-contents to generate a play list accordingly.

For example, the play list generation unit 811 selects one of the record picture data files "rscene1.mov" through "rscene10.mov" which has a reproduction time suitable for the quick tempo-type play list template shown in FIG. 16. Alternatively, the play list generation unit 811 processes the record picture data files "rscene1.mov" through "rscene10.mov" to have a reproduction time suitable for the quick tempo-type play list template shown in FIG. 16. The play list generation unit 811 generates the play list shown in FIG. 17, with the main contents identification information and the sub-contents identification information embedded therein. In the play list shown in FIG. 17, the record picture data files "rscene1.mov" through "rscene10.mov" are described to be reproduced sequentially. Additionally, in this play list, a quick tempo music file "music1.mp3" is described to be reproduced in coordination with the record pictures.

At step S607, based on the attribute information, the file management unit 805 selects an appropriate play list template file for the features of the sub-contents from the template information. That is, the file management unit 105 selects information related to a slow tempo-type play list template from the template information.

The slow tempo-type play list template here represents a play list template that corresponds to the slow tempo-type contents. As shown in FIG. 17, the slow tempo-type play list template includes a description 1201 that indicates unestablishment of record picture data files. The description 1201 includes a description that indicates switching between files for reproduction occurs at each timing shown in vertical lines (at each long time interval). The slow tempo-type play list template also includes another description 1202 that indicates unestablishment of sub-contents.

For the slow tempo-type play list template, the description 1201, which indicates each timing shown in vertical lines, is different from that of the quick tempo-type play list template. That is, each time interval for switching of main contents is longer than that of the quick tempo-type play list template. For example, with respect to the reproduction time for one music file, the number of switching is three (3) in the slow tempo-type play list template shown in FIG. 18, whereas the number of switching is nine (9) in the quick tempo-type play list template shown in FIG. 16. That is, with the slow tempo-type play list template shown in FIG. 18, record pictures will be switched at a long time interval. With the quick tempo-type play list template shown in FIG. 16, record pictures will be switched at a short time interval.

At step S608, the file management unit 805 outputs the selected play list template file as well as the main contents identification information, the sub-contents identification information and the attribute information to the play list generation unit 811.

The play list generation unit 811 generates a play list on the basis of the selected play list template file as well as the main contents identification information, the sub-contents identification information and the attribute information. The play list is to control each reproduction procedure of the main contents and the sub-contents. That is, the play list generation unit 811 selects main contents and sub-contents in consideration of the features of the sub-contents, while determining each reproduction procedure of the main contents and the sub-contents to generate a play list accordingly.

For example, the play list generation unit 811 selects one of the record picture data files "rscene11.mov" through "rscene14.mov" which has a reproduction time suitable for the slow tempo-type play list template shown in FIG. 18. Alternatively, the play list generation unit 811 processes the record picture data files "rscene11.mov" through "rscene14.mov" to have a reproduction time suitable for the slow tempo-type play list template shown in FIG. 18. The play list generation unit 811 generates the play list shown in FIG. 19, with the main contents identification information and the sub-contents identification information embedded therein. In the play list shown in FIG. 19, the record picture data files "rscene11.mov" through "rscene14.mov" are described to be reproduced sequentially. Additionally, in this play list, a slow tempo music file "music2.mp3" is described to be reproduced in coordination with the record pictures.

At step S609, the system controller 810 receives information related to a play list from the play list generation unit 811. Based on the play list, the system controller 810 controls the file management unit 805, the main contents decoder 806 and the sub-contents decoder 807, respectively, to reproduce the main contents and the sub-contents.

Specifically, the operation unit 112 accepts, e.g., a main reproduction request. The system controller 110 receives information related to the main reproduction request from the operation unit 112, and generates a read control signal on the basis of the information that is related to the main reproduction request and the play list. The system controller 810 provides the read control signal to the drive controller 103.

The drive controller 103 drives, e.g., an optical pickup or a motor of the disc I/F 102 on the basis of the read control signal. Consequently, the drive controller 103 causes the disc I/F 102 to read the information recorded on the recording medium 801 (the template information, the main contents information and the sub-contents information).

The disc I/F 102 provides information that is read out from the recording medium 101 to the error correction unit 104. The error correction unit 104 demodulates the read information while correcting any data error in the demodulated data. The error correction unit 104 provides the demodulated/corrected data (a digital data train) to the file management unit 105.

The file management unit 105 provides the demodulated/corrected data to the main contents decoder 106 and the sub-contents decoder 107. The main contents decoder 106 extracts and decodes the main contents information. The sub-contents decoder 107 extracts and decodes the sub-contents information.

The first output unit 808 reproduces and displays record pictures (main contents) decoded by the main contents decoder 806. The second output unit 809 reproduces and outputs music (sub-contents) decoded by the sub-contents decoder 807. That is, the first output unit 808 reproduces and displays short reproduction time record pictures (main contents) on the basis of the main reproduction request. In addition to this, the second output unit 809 reproduces and outputs quick tempo music (sub-contents) on the basis of the main reproduction request. Alternatively, the first output unit 808 reproduces and displays long reproduction time record pictures (main contents) on the basis of the main reproduction request. In addition to this, the second output unit 809 reproduces and outputs slow tempo music (sub-contents) on the basis of the main reproduction request. Consequently, reproduction is made according to the play list.

As described above, the features of the sub-contents can be reflected to the play list. This enables the sub-contents to be reproduced with being switched at a short time interval when the main contents are non-story-type contents and when the sub-contents are quick tempo-type contents. This also enables the sub-contents to be reproduced with being switched at a long time interval when the main contents are non-story-type contents and when the sub-contents are slow tempo-type contents. That is, each reproduction method of the main contents and the sub-contents can be changed depending on the features of the sub-contents. Therefore, the main contents can be reproduced with being switched at a suitable timing for the features of the sub-contents. That is, it is possible to reproduce the main contents and the sub-contents in coordination with the features of the sub-contents.

In addition, the attribute information may include information that is related to the rapidity of the changes in record pictures (main contents). Consequently, if it is determined that the sub-contents are quick tempo-type contents, the play list generation unit 811 selects record picture data files with rapid change on the basis of the attribute information. If it is determined that the sub-contents are slow tempo-type contents, the play list generation unit 811 selects record picture data files with little change on the basis of the attribute information.

In the play list shown in FIG. 17 or FIG. 19, a description for record pictures (main contents) may indicate that the record pictures (main contents) are to be reproduced randomly.

In addition, the sub-contents may include one of a caption and a contents explanation in addition to music.

Other Exemplary Embodiments of the Present Invention

Each unit included in the video image reproducing apparatus according to each exemplary embodiment of the present invention described above, as well as each step of the video image reproducing method, may be achieved by the operation of program stored in RAM, ROM, etc. in a computer. The program and a computer readable recording medium storing the program are both included within the scope of the present invention.

Additionally, the present invention may be embodied, e.g., in a system, an apparatus, a method, program or a storage medium, and specifically, the present invention may be applied to a system including multiple devices or to an apparatus including a single device.

In addition, the present invention provides, directly or remotely, to the system or apparatus a program of software that achieves the functions of the above exemplary embodiments (in the exemplary embodiments, program corresponding to a flowchart shown in FIG. 5 or FIG. 15). Then, the present invention may also be achieved by a computer of the system or apparatus reading and executing the provided program code, which is also included in the scope of the present invention.

Therefore, in order to achieve the functional operation of the present invention by the computer, a program code itself that will be installed in the computer also achieves the present invention. That is, computer program for achieving the functional operation of the present invention is also included in the scope of the present invention.

In this case, the computer program may take any form that includes program functions, e.g., in the form of an object code, program executed by an interpreter and script data provided to an OS.

For example, the recording medium for providing program includes a Floppy® disk, hard disk, optical disc, magneto-optical disk, MO, CD-ROM, CD-R, CD-RW, etc. The recording medium also includes a magnetic tape, non-volatile memory card, ROM, DVD (DVD-ROM, DVD-R), etc.

Other method for providing program is to connect to a website on the Internet through the browser of a client computer. Then, the program may be provided by downloading the computer program of the present invention itself or a compressed file including an auto-installation function from the website to a recording medium such as a hard disk.

Additionally, the program may also be provided by dividing the program codes included in the program of the present invention into files and downloading each file from different websites. This means that WWW servers are also included in the present invention that causes the program files to be downloaded to multiple users for achieving the functional operation of the present invention by the computer.

Additionally, the program of the present invention is stored in a storage medium such as a CD-ROM in an encrypted form, and it is distributed to a user so that the key information for decrypting the program is downloaded to the user who meets a predetermined condition from a website via the Internet. Then, the program of the present invention may also be provided by executing the encrypted program using the downloaded key information to cause the computer to install such program.

Additionally, the function of the above exemplary embodiments is achieved by the computer executing the read program. Further, the OS operated on the computer performs all or part of the actual operations based on the instruction of the program, thereby achieving the function of the above exemplary embodiments.

Moreover, the program read out from the recording medium is written to the memory that is provided at one of an expansion board inserted into the computer and an expansion unit connected to the computer. Then, the CPU provided at one of the expansion board and the expansion unit also performs all or part of the actual operations based on the instruction of the program, thereby also achieving the function of the above exemplary embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2006-283144, filed on Oct. 17, 2006, and No. 2007-213826, filed Aug. 20, 2007, which are hereby incorporated by reference herein in their entirety.

What is claimed is:

1. A video image reproducing apparatus for reproducing main content including video image data and sub-content associated with the main content, comprising:

a reading unit configured to read out sub-content information related to the sub-content to be reproduced with the main content, from a recording medium;

an attribute information obtaining unit configured to obtain attribute information indicative of features of the sub-content, on the basis of the sub-content information;

a play list generation unit configured to generate a play list for setting each reproduction procedure of the main content and the sub-content in accordance with features of the sub-content indicated by the attribute information; and a reproduction control unit configured to control each reproduction of a plurality of scenes included in the main content and the sub-content in accordance with the play list, wherein the sub-content includes character information superimposed on the main content, and wherein the play list generation unit generates a play list for reproducing continuously the plurality of scenes if the attribution information obtained in the attribute information obtaining unit indicates that the features of the character information indicates a content to be reproduced synchronously with the plurality of scenes, and generates a play list for reproducing the plurality of scenes with pause being interposed between the scenes so as to receive a reproduction request from a user during the pause if the attribution information obtained in the attribution information obtaining unit indicates that the features of the character information indicates a content to be reproduced asynchronously with the plurality of scenes.

2. The video image reproducing apparatus according to claim 1, wherein the attribute information obtaining unit selects one of multiple play list templates on the basis of the attribute information; and the play list generation unit generates the play list wherein each reproduction procedure of the main content and the sub-content is different, in accordance with the selected play list template.

3. The video image reproducing apparatus according to claim 1, wherein the attribute information obtaining unit selects one of multiple play list templates on the basis of the attribute information; and the play list generation unit generates the play list of different combinations of the main content and the sub-content, in accordance with the selected play list template.

4. The video image reproducing apparatus according to claim 1, wherein the character information include a caption and a content explanation and show different features between the caption and the content explanation.

5. The video image reproducing apparatus according to claim 1, wherein the attribute information includes information indicating whether or not the sub-content are reproduced in synchronization with the main content.

6. The video image reproducing apparatus according to claim 1, wherein the attribute information includes information indicating that the reproduction of the sub-content is updated in accordance with the operation of an operation unit operable by a user.

7. The video image reproducing apparatus according to claim 1, further comprising an operation unit configured to update reproduction of the sub-content, wherein the play list generation unit generates the play list describing that each reproduction of the main content and the sub-content is updated in accordance with the operation of the operation unit.

8. A video image reproducing method for reproducing main content including video image data and sub-content associated with the main content, comprising the steps of:

reading out sub-content information related to the sub-content to be reproduced with the main content, from a recording medium;

obtaining attribute information indicative of features of the sub-content, on the basis of the sub-content information;

generating a play list for setting each reproduction procedure of the main content and the sub-content in accordance with features of the sub-content indicated by the attribute information; and reproducing a plurality of scenes included in the main content and the sub-content in accordance with the play list, wherein the sub-content includes character information superimposed on the main content, and wherein the play list generation step includes generating a play list for reproducing continuously the plurality of scenes if the attribution information obtained in the obtaining step indicates that the features of the character information indicates a content to be reproduced synchronously with the plurality of scenes, and generating a play list for reproducing the plurality of scenes with pause being interposed between the scenes so as to receive a reproduction request from a user during the pause if the attribution information obtained in the obtaining step indicates that the features of the character information indicates a content to be reproduced asynchronously with the plurality of scenes.

9. A non-transitory storage medium computer-readably storing a program comprising a program code for causing a computer to execute a video image reproducing method for reproducing main content including video image data and sub-content associated with the main content, the method comprising the steps of:

reading out sub-content information related to the sub-content to be reproduced with the main content, from a recording medium;

obtaining attribute information indicative of features of the sub-content, on the basis of the sub-content information;

generating a play list for setting each reproduction procedure of the main content and the sub-content in accordance with features of the sub-content indicated by the attribute information; and reproducing a plurality of scenes included in the main content and the sub-content in accordance with the play list, wherein the sub-content includes character information superimposed on the main content, and wherein the play list generation step includes generating a play list for reproducing continuously the plurality of scenes if the attribution information obtained in the obtaining step indicates that the features of the character information indicates a content to be reproduced synchronously with the plurality of scenes, and generating a play list for reproducing the plurality of scenes with pause being interposed between the scenes so as to receive a reproduction request from a user during the pause if the attribution information obtained in the obtaining step indicates that the features of the character information indicates a content to be reproduced asynchronously with the plurality of scenes.

* * * * *